US010960421B2

(12) United States Patent
Altin et al.

(10) Patent No.: US 10,960,421 B2
(45) Date of Patent: Mar. 30, 2021

(54) FEED CENTER FOR DENSE PHASE SYSTEM

(71) Applicant: NORDSON CORPORATION, Westlake, OH (US)

(72) Inventors: Asim Altin, Duisburg (DE); Antonius Petrus Maria De Veer, Ve Oss (NL); Kai Flockenhaus, Cologne (DE); Terrence M. Fulkerson, Brunswick Hills, OH (US); William R. Hoversten, Cuyahoga Falls, OH (US); Thomas Loparo, Sheffield Lake, OH (US); Klaus Michels, Erkrath (DE); Richard William Vine, Yorkshire (GB)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 16/732,841

(22) Filed: Jan. 2, 2020

(65) Prior Publication Data
US 2020/0139389 A1 May 7, 2020

Related U.S. Application Data

(60) Division of application No. 16/183,541, filed on Nov. 7, 2018, now Pat. No. 10,525,490, which is a
(Continued)

(51) Int. Cl.
*B65G 53/24* (2006.01)
*B05B 7/14* (2006.01)
(Continued)

(52) U.S. Cl.
CPC .......... *B05B 7/1477* (2013.01); *B05B 7/1445* (2013.01); *B05B 7/1454* (2013.01);
(Continued)

(58) Field of Classification Search
CPC ........ B65G 53/16; B65G 53/18; B65G 53/22; B65G 53/24; B65G 53/26; B65G 53/28;
(Continued)

(56) References Cited

U.S. PATENT DOCUMENTS 3,955,717 A 5/1976 Landau
4,017,281 A 4/1977 Johnstone
(Continued)

FOREIGN PATENT DOCUMENTS

CN 101323399 A 12/2008
CN 101559415 A 10/2009
(Continued)

OTHER PUBLICATIONS

CN Office Action dated Jun. 5, 2018 for CN Application No. 201580019097.
(Continued)

*Primary Examiner* — Joseph A Dillon, Jr.
(74) *Attorney, Agent, or Firm* — Baker & Hostetler LLP

(57) ABSTRACT

A feed center for powder coating material includes a hopper, an extraction duct, and a control valve. The hopper is in fluid communication with a fluidizing pressure source. The extraction duct is in fluid communication with at least one suction source. The control valve connects the extraction duct with an extraction port of the hopper. The control valve is operable between a first position for applying suction from the at least one suction source to the hopper, and a second position providing an exterior opening in at least one of the control valve and the first extraction duct for exhausting pressurized fluid from the hopper and/or collecting at least some of the air and powder that is exhausted from the powder.

12 Claims, 20 Drawing Sheets

Related U.S. Application Data continuation of application No. 15/300,600, filed as application No. PCT/US2015/024206 on Apr. 3, 2015, now Pat. No. 10,150,124.

(60) Provisional application No. 61/976,102, filed on Apr. 7, 2014.

(51) Int. Cl.
*B05B 12/08* (2006.01)
*B05B 12/14* (2006.01)
*B05B 14/48* (2018.01)
*B65G 53/26* (2006.01)

(52) U.S. Cl.
CPC .......... *B05B 7/1468* (2013.01); *B05B 7/1472* (2013.01); *B05B 12/081* (2013.01); *B05B 12/14* (2013.01); *B05B 14/48* (2018.02); *B65G 53/26* (2013.01)

(58) Field of Classification Search
CPC .... B65G 69/18; B65G 69/182; B65G 69/186; B05B 7/14; B05B 7/1477; B05B 14/48; B65D 88/72
USPC ......... 406/14, 15, 16, 17, 18, 134, 151, 197; 222/195; 239/143; 414/291; 454/56, 57, 454/58, 59, 60, 61, 62
See application file for complete search history.

(56) References Cited

U.S. PATENT DOCUMENTS

| | | | |
|---|---|---|---|
| 4,127,307 A | 11/1978 | Bentzen-Bilkvist | |
| 4,362,442 A | 12/1982 | Bentzen-Bilkvist et al. | |
| 4,466,760 A | 8/1984 | Feldsted | |
| 4,501,518 A | 2/1985 | Smith | |
| 4,599,016 A | 7/1986 | Medemblik | |
| 5,716,267 A * | 2/1998 | Hambleton | B08B 15/023 454/56 |
| 5,947,800 A | 9/1999 | Fring | |
| 6,273,154 B1 * | 8/2001 | Laug | B05B 14/10 141/97 |
| 6,325,572 B1 | 12/2001 | Dietrich | |
| 6,444,002 B1 * | 9/2002 | Mai | A45D 29/00 454/56 |
| 6,899,042 B1 | 5/2005 | Kowalchuk | |
| 6,942,133 B2 | 9/2005 | Frankeberger et al. | |
| 6,994,497 B1 | 2/2006 | Eriksson et al. | |
| 7,150,585 B2 | 12/2006 | Kleineidam et al. | |
| 7,740,423 B2 | 6/2010 | Newbolt et al. | |
| 7,997,878 B2 | 8/2011 | Fulkerson | |
| 8,113,745 B2 | 2/2012 | Aoki | |
| 8,256,997 B2 | 9/2012 | Brown | |
| 8,360,691 B2 | 1/2013 | Moretto | |
| 8,727,671 B2 | 5/2014 | Sundholm | |
| 9,174,812 B2 | 11/2015 | Harris | |
| 9,376,272 B2 | 6/2016 | Sato et al. | |
| 9,631,869 B2 | 4/2017 | Shimono et al. | |
| 9,650,206 B2 | 5/2017 | Steele | |
| 9,688,485 B2 | 6/2017 | Srensen et al. | |
| 9,758,319 B2 | 9/2017 | Celella | |
| 9,758,320 B2 | 9/2017 | Sundholm | |
| 9,896,265 B2 | 2/2018 | Sundholm | |
| 2002/0078883 A1 | 6/2002 | Shutic et al. | |
| 2009/0269149 A1 | 10/2009 | Hilgraf | |
| 2010/0221125 A1 | 9/2010 | Fulkerson et al. | |
| 2010/0260584 A1 * | 10/2010 | Hall | B65G 69/182 414/291 |
| 2010/0267321 A1 * | 10/2010 | Huang | B08B 15/023 454/56 |
| 2012/0209437 A1 | 8/2012 | Fulkerson et al. | |
| 2012/0279572 A1 | 11/2012 | Pedersen | |
| 2014/0239533 A1 | 8/2014 | Maguire | |
| 2015/0050091 A1 | 2/2015 | Sundholm | |
| 2015/0101960 A1 | 4/2015 | Albin | |
| 2015/0110565 A1 * | 4/2015 | Harris | B65G 53/60 406/144 |
| 2015/0191316 A1 | 7/2015 | Sato et al. | |
| 2017/0002460 A1 * | 1/2017 | Keller | C23C 4/134 |
| 2017/0144848 A1 * | 5/2017 | Koehler | B65G 69/182 |
| 2019/0053421 A1 | 2/2019 | Schoeny et al. | |
| 2019/0314836 A1 * | 10/2019 | Lutz | B05B 7/1463 |

FOREIGN PATENT DOCUMENTS

| | | |
|---|---|---|
| EP | 2374546 A1 | 10/2011 |
| GB | 0608075 | 9/1948 |
| WO | 2005/018823 A2 | 3/2005 |
| WO | 2005/046887 A2 | 5/2005 |
| WO | 2005/051549 A1 | 6/2005 |
| WO | 2013/140031 A1 | 9/2013 |
| WO | 2013/154702 A1 | 10/2013 |

OTHER PUBLICATIONS

European search report dated Oct. 25, 2018 for EP Application No. 18175619.

European search report dated Oct. 25, 2018 for EP Application No. 18175626.

* cited by examiner

FEED CENTER FOR DENSE PHASE SYSTEM

CROSS-REFERENCE TO RELATED APPLICATION

This application is a divisional of U.S. patent application Ser. No. 16/183,541, filed Nov. 7, 2018, which is a continuation of U.S. patent application Ser. No. 15/300,600, filed Sep. 29, 2016, now U.S. Pat. No. 10,150,124, which is a U.S. National Stage Application of International Patent App. No. PCT/US2015/024206, filed Apr. 3, 2015, which claims the benefit of U.S. Provisional Patent App. No. 61/976,102, filed Apr. 7, 2014, the entire contents of all of which are hereby incorporated herein by reference as if set forth in their entirety herein.

TECHNICAL FIELD OF THE INVENTION

The invention relates generally to powder coating material application systems. More particularly, the invention relates to a feed center for dense phase powder delivery systems.

BACKGROUND OF THE INVENTION

Material application systems are used to apply one or more powder coating materials to an object. General examples are powder coating systems and other particulate material application systems such as may be used in the food processing and chemical industries. These are but a few examples of wide and numerous varieties of systems used to apply particulate materials to an object.

There are two generally known types of dry particulate material transfer processes, referred to herein as dilute phase and dense phase. Dilute phase systems utilize a substantial quantity of air to push material through one or more hoses or other conduit from a supply to a spray applicator. A common pump design used in powder coating systems is a Venturi pump which introduces a large volume of air under pressure and higher velocity into the powder flow. In order to achieve adequate powder flow rates (in pounds per minute or pounds per hour for example), the components that make up the flow path must be large enough to accommodate the flow with such high air to material (in other words lean flow) otherwise significant back pressure and other deleterious effects can occur.

Dense phase systems on the other hand are characterized by a high material to air ratio (in other words a "rich" flow). A dense phase pump is described in U.S. Pat. No. 7,150,585, the entire disclosure of which is appended hereto and fully incorporated herein by reference, and which is owned by the assignee of the present inventions. This pump is characterized in general by a pump chamber that is partially defined by a gas permeable member. Material, such as powder coating material as an example, is drawn into the chamber at one end by gravity and/or negative pressure and is pushed out of the chamber through an opposite end by positive air pressure. This pump design is very effective for transferring material, in part due to the novel arrangement of a gas permeable member forming part of the pump chamber. The overall pump, however, in some cases may be less than optimal for purging, cleaning, color change, maintenance and material flow rate control. A useful feature of this pump is that it can be operated in reverse and forward modes for purge operations.

SUMMARY OF THE DISCLOSURE

A first inventive concept presented herein provides a feed center for a powder coating material application system. In an embodiment, the feed center includes a feed hopper with an extraction duct that may be manually opened and closed to suction. Additional embodiments are disclosed herein.

A second inventive concept presented herein provides a dual function platform or base for a supply of powder coating material. In an embodiment, the platform has a vibratory portion and a load sensing portion. Additional embodiments are disclosed herein.

A third inventive concept presented herein provides a color change or cleaning process for a feed center. In an embodiment, the process includes cleaning powder from the feed center with reusable powder being reclaimed to a powder recovery system and unusable powder being sent to waste. Additional embodiments are disclosed herein.

A fourth inventive concept presented herein provides a color change or cleaning process or operation for a feed center with dense phase powder delivery is provided. In an embodiment, a color change or cleaning operation for a feed center includes using a dense phase pump to purge or assist in cleaning powder from the feed center. Additional embodiments are disclosed herein.

These and other inventive concepts and embodiments as well as additional aspects and advantages of the inventions disclosed herein will be apparent to those skilled in the art from the following description of the exemplary embodiments in view of the accompanying drawings.

DETAILED DESCRIPTION OF THE INVENTIONS AND EXEMPLARY EMBODIMENTS THEREOF

Figure 1:
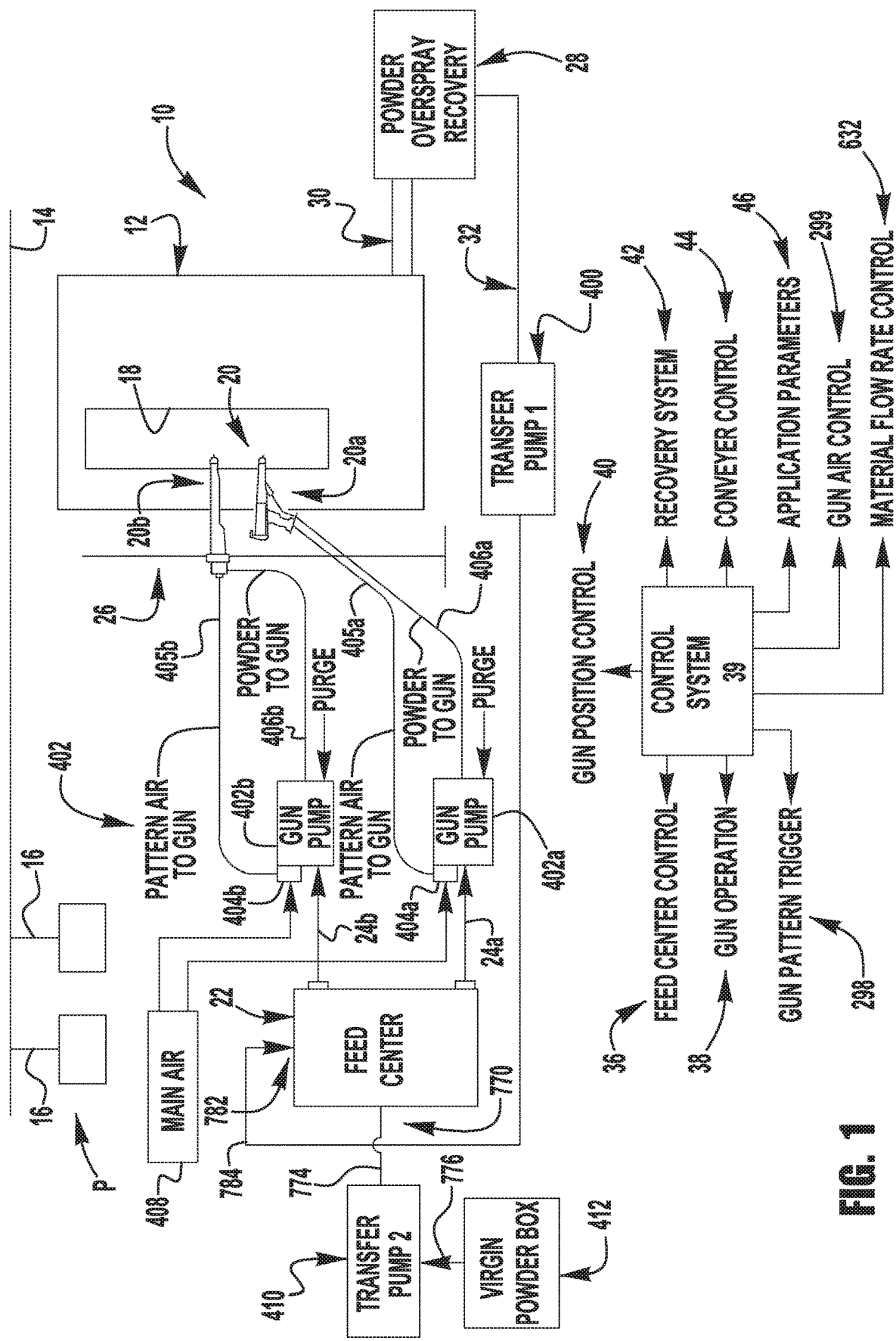
FIG. 1 is a simplified schematic diagram of a powder coating material application system that may utilize the present inventions.

The disclosure and teachings herein contemplate a feed center for a powder coating material application system (also referred to herein as a powder coating system.) Although the exemplary embodiments illustrated herein relate to a dense phase powder system, the teachings and inventions herein are not necessarily limited to dense phase systems, as will be apparent to those skilled in the art An embodiment of a powder coating material application system may include a dense phase pump for particulate material. The pump may be used in combination with any number or type of spray applicator devices or spray guns, powder coating spray booths and material supply.

By "dense phase" is meant that the air present in the particulate flow is about the same as the amount of air used to fluidize the material at the supply such as a feed hopper. As used herein, "dense phase" and "high density" are used to convey the same idea of a low air volume mode of material flow in a pneumatic conveying system where not all of the material particles are carried in suspension. In such a dense phase system, the material is forced by pressure along a flow path by significantly less air volume as compared to a conventional dilute phase system, with the material flowing more in the nature of plugs that push each other along the passage, somewhat analogous to pushing the plugs as a piston through the passage. With smaller cross-sectional passages this movement can be effected under lower pressures.

In contrast, conventional flow systems tend to use a dilute phase which is a mode of material flow in a pneumatic conveying system where all the particles are carried in suspension. Conventional flow systems introduce a significant quantity of air into the flow stream in order to pump the material from a supply and push it through under positive pressure to the spray application devices. For example, most conventional powder coating spray systems utilize Venturi pumps to draw fluidized powder from a supply into the pump. A Venturi pump by design adds a significant amount of air to the powder stream. Typically, flow air and atomizing air are added to the powder to push the powder under positive pressure through a feed hose and an applicator device. Thus, in a conventional powder coating spray system, the powder is entrained in a high velocity high volume flow of air, thus necessitating large diameter powder passageways in order to attain usable powder flow rates.

As compared to conventional dilute phase systems having air volume flow rates of about 3 to about 6 cfm (such as with a Venturi pump arrangement, for example), the present inventions may operate at about 0.8 to about 1.6 cfm, for example. Thus, in the present inventions, powder delivery rates may be on the order of about 150 to about 300 grams per minute. These values are intended to be exemplary and not limiting. Pumps in accordance with the present inventions can be designed to operate at lower or higher air flow and material delivery values.

Dense phase versus dilute phase flow can also be thought of as rich versus lean concentration of material in the air stream, such that the ratio of material to air is much higher in a dense phase system. In other words, in a dense phase system the same amount of material per unit time is transiting a flow path cross-section (of a tube for example) of lesser area as compared to a dilute phase flow. For example, in some embodiments of the present inventions, the cross-sectional area of a powder feed tube is about one-fourth the area of a feed tube for a conventional Venturi type system. For comparable flow of material per unit time then, the material is about four times denser in the air stream as compared to conventional dilute phase systems.

With reference to FIG. 1, in an exemplary embodiment, the present inventions are illustrated being used with a powder coating material application system, such as, for example, a typical powder coating material application system 10. Such an arrangement commonly includes a powder spray booth 12 in which an object or part P is to be sprayed with a powder coating material. The application of powder to the part P is generally referred to herein as a powder spray, coating or application operation procedure or process, however, there may be any number of control functions, steps and parameters that are controlled and executed before, during and after powder is actually applied to the part.

As is known, the part P is suspended from an overhead conveyor 14 using hangers 16 or any other conveniently suitable arrangements. The booth 12 includes one or more openings 18 through which one or more spray applicators 20 may be used to apply powder coating material to the part P as it travels through the booth 12. The applicators 20 may be of any number depending on the particular design of the overall system 10. Each applicator can be a manually operated device as with device 20*a*, or a system controlled device, referred to herein as an automatic applicator 20*b*, wherein the term "automatic" simply refers to the fact that an automatic applicator is mounted on a support and is triggered on and off by a control system, rather than being manually supported and manually triggered. The present inventions are directed to manual and automatic spray applicators.

It is common in the powder coating material application industry to refer to the powder applicators as powder spray guns, and with respect to the exemplary embodiments herein we will use the terms applicator and gun interchangeably. However, it is intended that the inventions are applicable to material application devices other than powder spray guns, and hence the more general term applicator is used to convey the idea that the inventions can be used in many particulate material application systems other than the exemplary powder coating material application system described herein. Some aspects of the inventions are likewise applicable to electrostatic spray guns as well as non-electrostatic spray guns. The inventions are also not limited by functionality associated with the word "spray". Although the inventions are especially suited to powder spray application, the pump concepts and methods disclosed herein may find use with other material application techniques beyond just spraying, whether such techniques are referred to as dispensing, discharge, application or other terminology that might be used to describe a particular type of material application device.

The spray guns 20 receive powder from a supply or feed center such as a hopper 22 or other material supply through an associated powder feed or supply hose 24. The present teachings are directed to the feed center, especially the hopper and associated components.

The automatic guns 20*b* typically are mounted on a support 26. The support 26 may be a simple stationary structure, or may be a movable structure, such as an oscillator that can move the guns up and down during a coating operation or a gun mover or reciprocator that can move the guns in and out of the spray booth, or a combination thereof.

The spray booth 12 is designed to contain powder overspray within the booth, usually by a large flow of containment air into the booth. This air flow into the booth is usually effected by a powder overspray recovery system 28. The recovery system 28 pulls air with entrained powder overspray from the booth, such as for example through a duct 30. In some systems the powder overspray is returned to the feed center 22 as represented by the return line 32. In other systems the powder overspray is either dumped or otherwise reclaimed in a separate receptacle. An example of a powder recovery apparatus is a cyclone separator.

In the exemplary embodiment herein, powder is transferred from the recovery system 28 back to the feed center 22 by a first transfer pump 400. A respective gun pump 402 may be used to supply powder from the feed center 22 to an associated spray applicator or gun 20. For example, a first gun pump 402a may be used to provide dense phase powder flow to the manual gun 20a and a second gun pump 402b may be used to provide dense phase powder flow to the automatic gun 20b. While any suitable pump, may be utilized, in an exemplary embodiment, the pumps 400, 402 include dense phase powder pumps.

In the FIG. 1 embodiment, a second transfer pump 410 is used to transfer powder from a supply 412 of virgin powder (that is to say, previously unused) that is usually located within the feed center 22. Those skilled in the art will understand that the number of required transfer pumps 410 and gun pumps 402 will be determined by the requirements of the overall system 10 as well as the spraying operations to be performed using the system 10.

Although the gun pump and the transfer pumps may be the same design, in the exemplary embodiments there are differences that will be described hereinafter. Those differences take into account that the gun pump preferably provides a smooth consistent flow of powder material to the spray applicators 20 in order to provide the best coating onto the objects P, whereas the transfer pumps 400 and 410 are simply used to move powder from one receptacle to another at a high enough flow rate and volume to keep up with the powder demand from the applicators and as optionally supplemented by the powder overspray collected by the recovery system 28.

Other than the pumps 400, 410 and 402, the selected design and operation of the material application system 10, including the spray booth 12, the conveyor 14, the guns 20, and the recovery system form no necessary part of the present inventions and may be selected based on the requirements of a particular coating application. A particular spray applicator, however, that is well suited for use with the present inventions is described in International patent application number PCT/US04/26887, filed on Aug. 18, 2004, the entire disclosure of which is incorporated herein by reference. However, many other applicator designs may be used as required for a particular application. A control system 39 likewise may be a conventional control system such as a programmable processor based system or other suitable control circuit. The control system 39 executes a wide variety of control functions and algorithms, typically through the use of programmable logic and program routines, which are generally indicated in FIG. 1 as including but not necessarily limited to feed center control 36 (for example supply controls and pump operation controls), gun operation control 38 (such as for example, gun trigger controls), gun position control 40 (such as for example control functions for the reciprocator/gun mover 26 when used), powder recovery system control 42 (for example, control functions for cyclone separators, after filter blowers and so on), conveyor control 44 and material application parameter controls 46 (such as for example, powder flow rates, applied film thickness, electrostatic or non-electrostatic application and so on). Conventional control system theory, design and programming may be utilized.

While the described embodiments herein are presented in the context of a dense phase pump for use in a powder coating material application system, those skilled in the art will readily appreciate that the present inventions may be used in many different dry particulate material application systems, including but not limited in any manner to: talc on tires, super-absorbents such as for diapers, food related material such as flour, sugar, salt and so on, desiccants, release agents, and pharmaceuticals. These examples are intended to illustrate the broad application of the inventions for dense phase application of particulate material to objects. The specific design and operation of the material application system selected provides no limitation on the present inventions except as otherwise expressly noted herein.

Even from the general schematic illustration of FIG. 1 it can be appreciated that such complex systems can be very difficult and time consuming to clean and to provide for color change. Herein we use the terms color change and cleaning operations interchangeably because any color change operation will usually involve a cleaning operation. Typical powder coating material is a very fine particulate and tends to be applied in a fine cloud or spray pattern directed at the objects being sprayed. Even with the use of electrostatic technology, a significant amount of powder overspray is inevitable. Cross contamination during color change is a significant issue in many industries, therefore it is important that the material application system be able to be thoroughly cleaned between color changes. Color changes however necessitate taking the material application system offline and thus is a significant cost driver.

The feed center concepts presented herein work particularly well with a dense phase pump that can be purged in an opposite direction. It should be noted that the ability to optionally purge in only the forward or reverse direction provides a better purging capability because if purging can only be done in both directions at the same time, the purge air will flow through the path of least resistance whereby some of the powder path regions may not get adequately purged. For example, when trying to purge a spray applicator and a supply hopper, if the applicator is completely open to air flow, the purge air will tend to flow out the applicator and might not adequately purge the hopper or supply.

Figure 2:
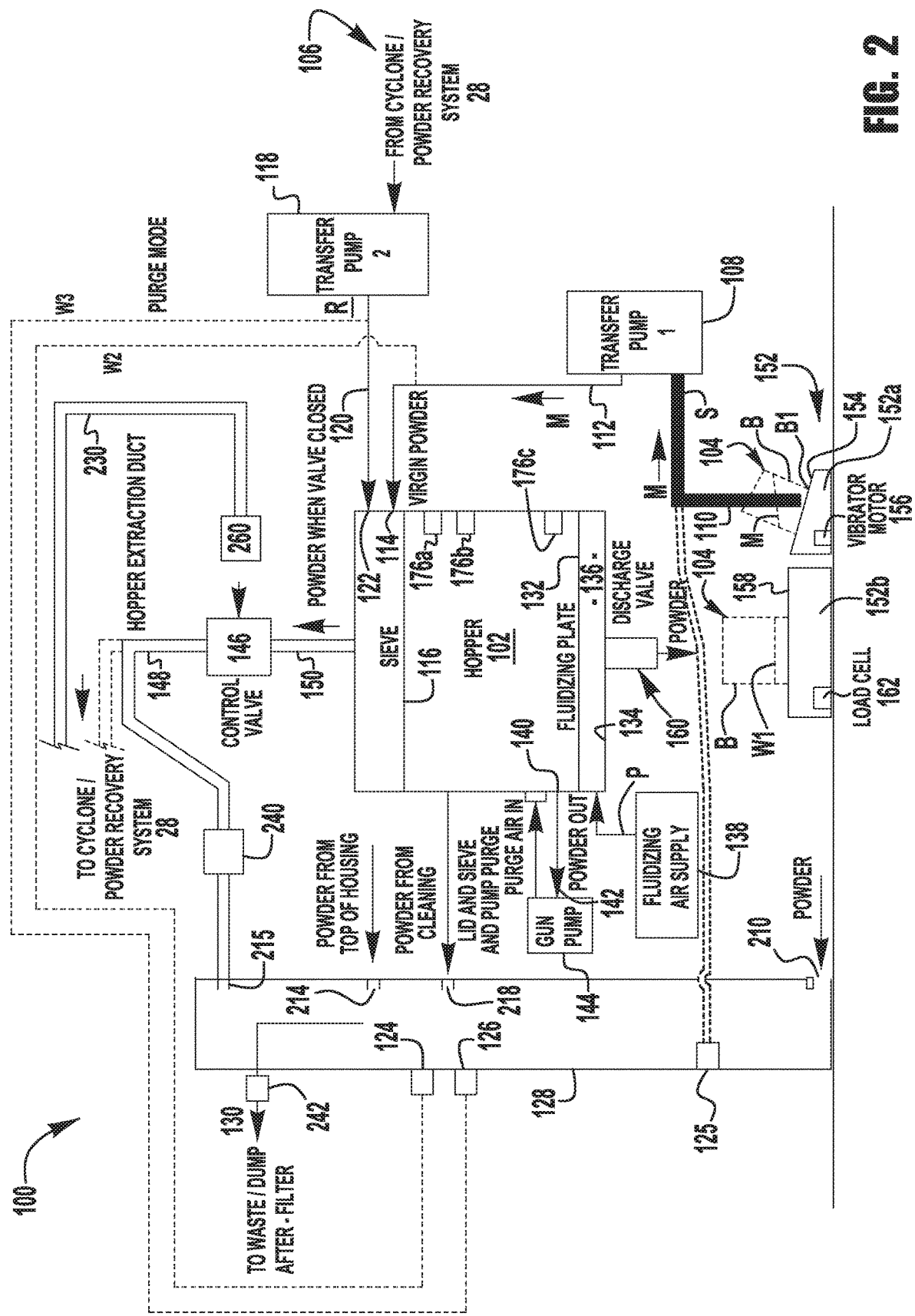
FIG. 2 is a functional block diagram of a feed center in accordance with the teachings herein.

With reference next to FIG. 2, a feed center 100 may include a hopper 102 having one or more inlets that are used for receiving and fluidizing powder coating material from a first or virgin supply 104 and optionally for receiving and fluidizing previously unused powder coating material from a second or reclaim supply 106. The first supply 104 may be, for example, a container B such as a box of new powder coating material M (material M). The second supply 106 may be the powder overspray recovery system 28 associated with the spray booth 12, for example, a cyclone separator that supplies reclaim powder coating material R (material R). In FIG. 2 the container B is shown in dashed lines because the box is positioned in two different locations within the feed center 100, a first position being for a coating operation in which the powder coating material M is drawn from the container B, and a second position being for a cleaning operation in which the container B is not full and may be used as a first receptacle to collect unused powder (e.g., virgin powder or a mixture of virgin and reclaim powder) to reclaim for future use.

Figure 3:
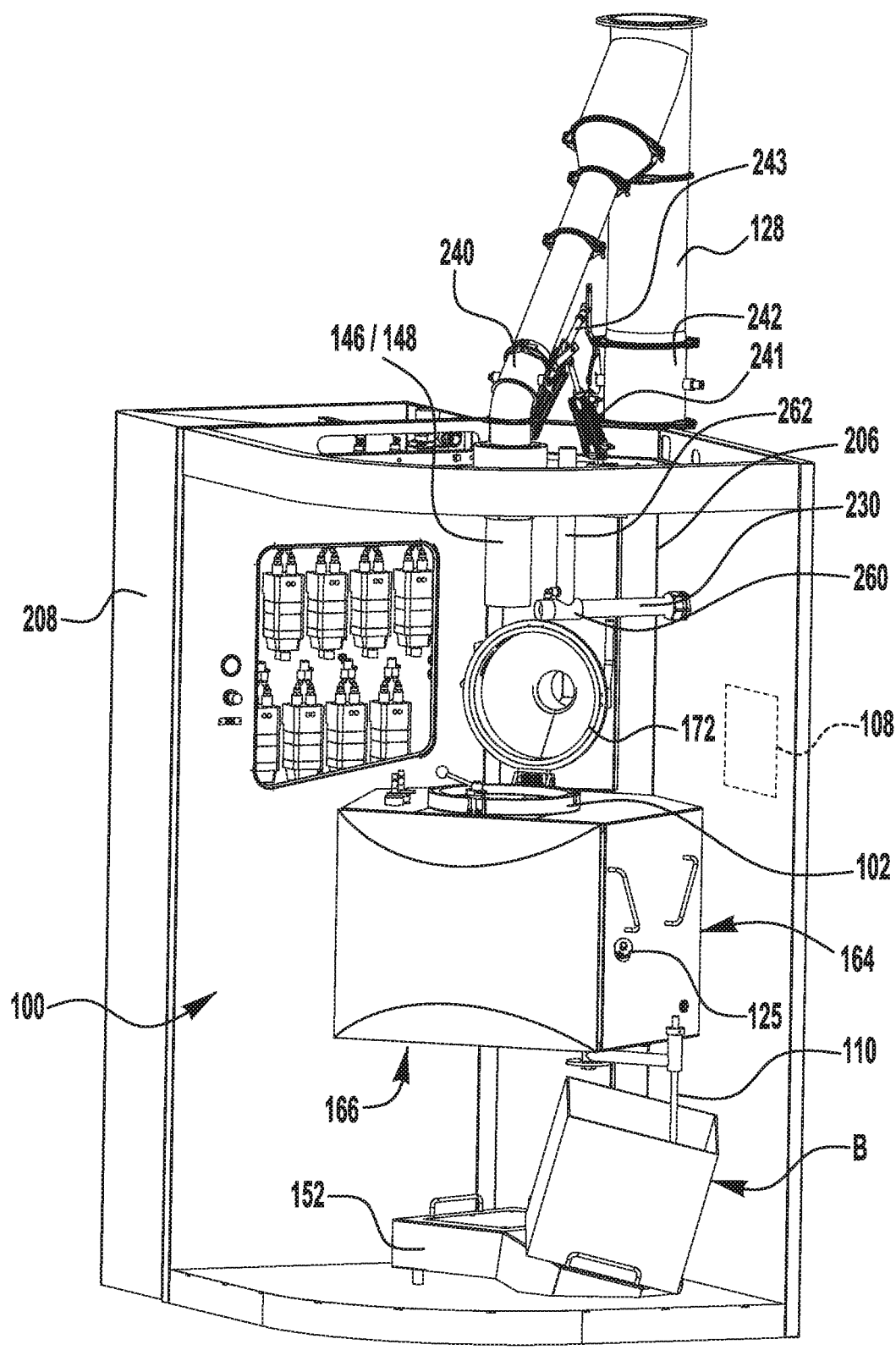
FIG. 3 is an embodiment of the feed center of FIG. 2.

A first transfer pump 108 (for example, on an exterior surface of the feed center enclosure 208, as shown in FIG. 3), such as a dense phase pump described hereinabove, may be used to remove powder coating material M from the container B through a suction hose S that is connected to a suction tube 110 and to push the material M through a first supply hose 112 to a first powder inlet 114 into the hopper 102 at a location that is above an optional sieve 116. A second transfer pump 118, which may also be a dense phase pump described hereinabove, may be used to remove the reclaim powder coating material R from the recovery system 28, for example an outlet of a cyclone (not shown), and to transfer the material R through a second supply hose 120 to a second powder inlet 122 into the hopper 102 also at a location that is above the optional sieve 116. As noted above, each transfer pump may be operated in purge mode, meaning that for a cleaning operation each transfer pump can push powder that remains in the pump and hoses back to the feed center 100, by connection of the suction and discharge hoses to the purge ports, a cyclone pan, and/or a waste vessel during the purge sequence. Thus, the first transfer pump 108 pushes waste powder W2 into a first purge inlet 124 and the second transfer pump 118 pushes waste powder W3 into a second purge inlet 126. During a cleaning operation, the operator manually disconnects the first supply hose 112 from the first powder inlet 114 and connects it to the first purge inlet 124; and disconnects the second supply hose 120 from the second powder inlet 122 and connects it to the second purge inlet 126. The end of the suction tube 110 is withdrawn from the box and connected to a third purge inlet 125 (FIG. 3). These purge inlets are connected in fluid communication with an enclosure extraction duct 128 (described in greater detail below) through hoses and do not feed into the hopper 102. The waste powder W2/W3 does not actually enter into the hopper 102 but rather is routed within a housing (not shown in FIG. 2) that encloses the hopper 102 to the enclosure extraction duct 128. The enclosure extraction duct 128 is in fluid communication with an after filter or other waste/dump collection system 130 (FIG. 2).

In the lower portion of the hopper 102 is a fluidizing bed or plate 132 which is spaced above a bottom wall or floor 134 of the hopper 102 so as to provide a plenum 136. Pressurized fluidizing air P is supplied from an air source 138 to the plenum 136. As is known, the fluidizing bed 132 is porous to air and not to the material M and R so that the fluidizing air produces a volume of fluidized material within the hopper 102. The hopper 102 includes a plurality of powder outlet ports 140 each of which may be connected by a feed hose 142 to a gun pump 144. Each gun pump 144 may be a dense phase pump as described hereinabove and draws fluidized dense phase powder from the hopper 102 and moves the powder to a spray gun over at the spray booth. In such an embodiment, the gun pump 144 may also be operated in a purge mode in which purge air is provided in a reverse direction from the pump 144 into the hopper 102 through the same powder outlet port 140 that the gun pump 144 used to draw powder from the hopper 102. Although FIG. 2 shows the gun pump purge as a separate "line" into the hopper 102, in practice the gun pump purge is reversed through the same feed hose 142 into the same powder outlet port 140 (being used as a purge inlet into the hopper 102 during a cleaning operation.) Therefore, during a cleaning operation all the gun pumps purge back into the hopper 102.

According to an aspect of the present application, a hopper for a coating system feed center may be configured such that in a cleaning mode of operation, a suction from at least one suction source may be applied to the hopper to remove any powder coating material from an internal volume of the hopper through an extraction duct (and delivering the removed material, for example, to a recovery system or a waste collection system), and in a coating mode of operation, the hopper is in fluid communication with an enclosure surrounding the hopper, to maintain the hopper at substantially ambient pressures for effective continued fluidization of the powder coating material. While many arrangements may be utilized to provide selective fluid communication between the hopper and the surrounding enclosure, in one embodiment, a control valve connecting the hopper to the extraction duct may be operable to provide an exterior opening to allow pressurized fluidizing air to be exhausted from or otherwise exit the hopper (to prevent increases in positive pressure within the hopper) and/or to provide a suction break between the hopper and a suction source preventing at least some of the suction from being applied by the at least one suction source to the hopper (to prevent increases in negative pressure within the hopper).

In the illustrated embodiment, a control valve 146 is connected to an extraction duct 148 for controlling removal of powder coating material from an extraction outlet 150 of the hopper 102 during a cleaning operation. The duct 148 may be in fluid communication with the waste/dump collection system 130 (FIG. 2), through an inlet portion 215 connected to the enclosure extraction duct 128. Alternatively, the extraction duct 148 may be in fluid communication with the powder recovery system 28 such as an inlet to a cyclone. The exemplary control valve 146 has at least two positions. In a first position for coating operations, the control valve 146 is open (e.g., to the feed center enclosure) and provides an exterior port opening to maintain ambient pressure within the hopper, and a fluidized condition of the powder coating material. In some embodiments, suction to the first extraction duct is blocked or sufficiently reduced (e.g., by a flow control valve) to allow pressurized fluidizing air to exit the hopper through the exterior port opening. In other embodiments, suction to the first extraction duct is at least partially maintained, and the exterior port opening may function as a suction break to prevent suction from being applied to the hopper, at least partially interrupting the application of the suction from the suction source to the hopper.

In a second position for cleaning operations, the control valve 146 is closed (i.e., the exterior port opening is closed or blocked), meaning that the control valve 146 allows the extraction duct 148 (and hence the waste/dump collection system 130, or alternatively, the recovery system 28) to apply suction to the hopper. In some embodiments, the control valve may be operable to additional intermediate or partially open positions, for example, to provide a reduced suction break.

A platform or base 152 may be used for the first supply 104 and may include two sections. A first section 152*a* may be a slanted or angled (with respect to horizontal) support surface 154 that tilts the container B towards a lower corner B1. The suction tube 110 during a coating operation extends down into the container B near the lower corner B1 so as to be able to draw as much of the material M from the container B as possible. The first section 152*a* may include an optional vibrator motor 156 to vibrate the container B so as to assist in urging the material M towards the lower corner B1. The second section 152*b* may include a flat support surface 158 and is preferably positioned under the hopper 102. The hopper 102 includes a discharge valve 160 that when open will dump powder from the hopper 102 into the container B. The second section 152b may include an optional load cell or sensor 162 for weighing the container B either as a new full container to obtain an initial weight of the material, and a weight of the powder remaining after discharge from the hopper 102 during a cleaning operation. The difference in the two values provides an indication of the amount of powder used during the coating operations.

During a coating operation the container B is placed on the vibratory first section 152a, somewhat off to the side so that the suction tube 110 can be inserted down into the container B. During a cleaning operation, the container B is moved from the first section 152a and placed on the flat horizontal surface 158 under the discharge valve 160 so that when the discharge valve 160 is opened, powder will be discharged from the hopper 102 into the container B for re-use. Although FIG. 2 illustrates the platform sections 152a and 152b as two separate parts, such is exemplary. As an alternative, the sections 152a and 152b may be part of a single unit, along with isolating the load cell 162 from the vibrations from the motor 156.

With reference to FIG. 3, an embodiment of a feed center 100 is illustrated. The feed center 100 is illustrated for a cleaning operation. The feed center 100 may include a housing 164 that encloses the hopper 102, along with hoses that can be routed out of view. The housing 164 may include a front cover 166 that is easily removable so that an operator has easy access to the hopper 102 and related parts. The feed center 100 may also include the first transfer pump 108, the suction tube 110 and the extraction duct 148 with the control valve 146 being realized in the form of an external sleeve (described further below and also referred to herein as a sleeve control valve 146.) In other embodiments, other types of control valves may be used. The platform 152 is shown with the container B still positioned on the slanted vibratory section 152a prior to being moved over to the flat section 152b. The suction hose S is not shown but would connect the suction tube 110 to the suction input of the first transfer pump 108.

Figure 4:
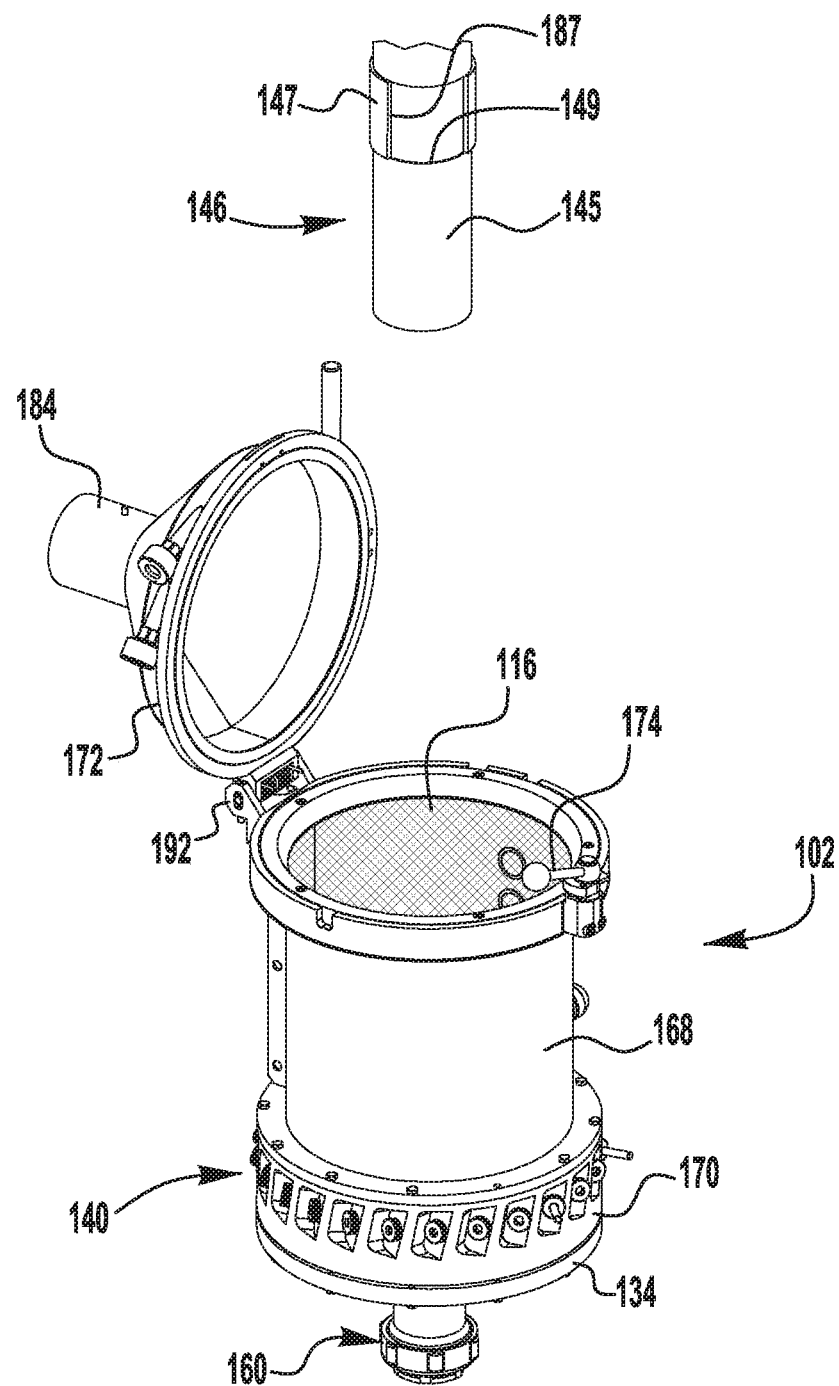
FIG. 4 is a hopper and sleeve control valve for an extraction duct.
Figure 5:
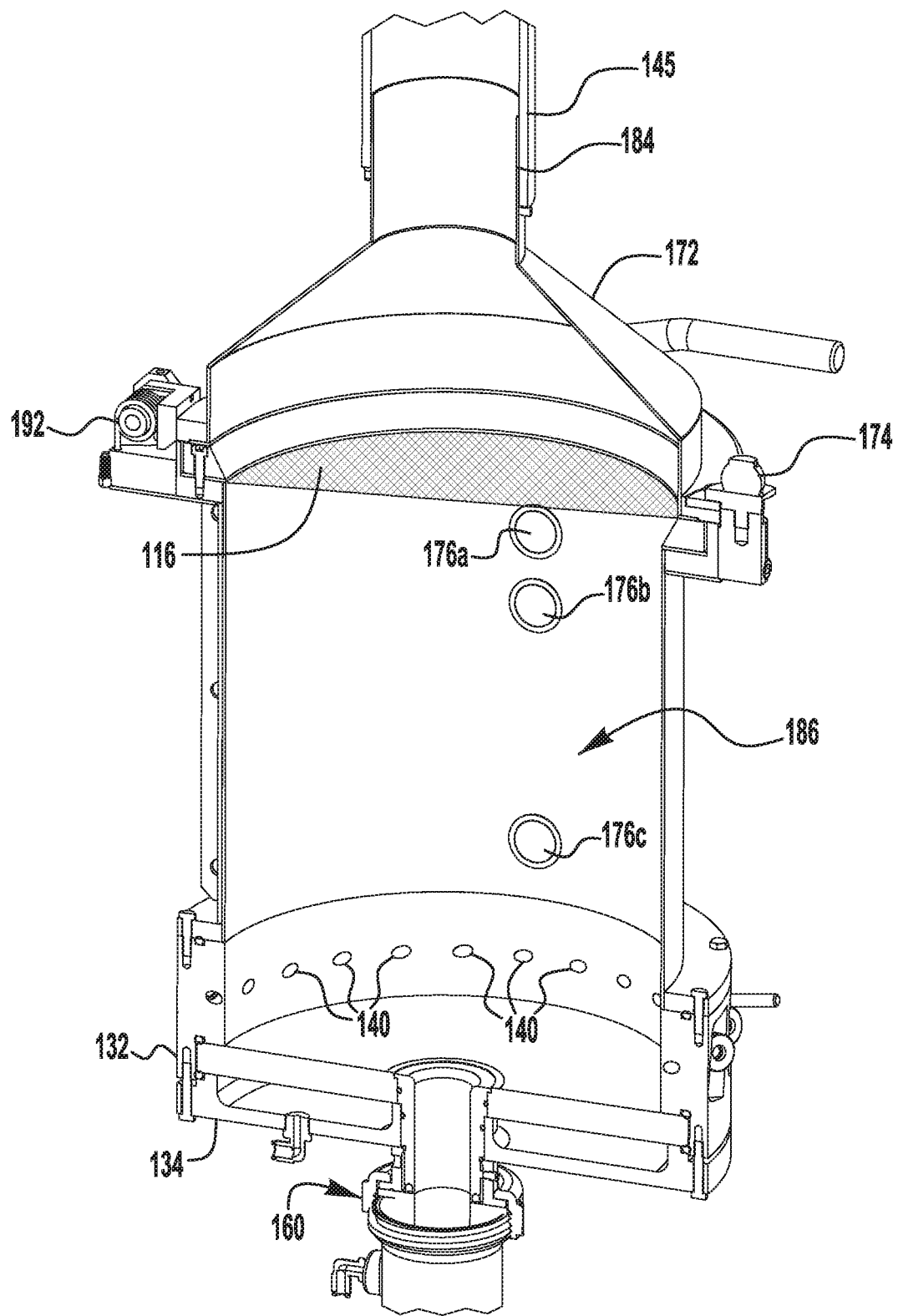
FIG. 5 is a longitudinal cross-section of the hopper of FIG. 4.

FIG. 4 illustrates the hopper 102 shown without the housing 164 but including the extraction duct 148 and the sleeve control valve 146. FIG. 5 is a longitudinal cross-section of the hopper 102 with the cap 172 in the lowered clamped position. The hopper 102 may include a cylinder 168 that holds the material M and R that is fluidized and drawn out by the gun pumps 144. The cylinder 168 is mounted on a powder ring 170 having the plurality of the powder outlet ports 140. The powder ring 170 is mounted to the air plenum 136 that is enclosed by the fluidizing plate 132 (not visible in FIG. 4.) A cover or cap 172 may be hinged to the upper end of the cylinder 168 so that the cap 172 can be swung down to operate in a coating operation position (see FIG. 5) when the valve 146 is open and to operate in a first cleaning position when the valve 146 is closed. The cap 172 (or other such opening portion of the hopper) may be swung or pivoted up for a second cleaning position. A clamp arrangement 174 may be used to tightly secure the cap 172 to the hopper cylinder 168. The sieve 116 is visible in FIG. 4 as well as the discharge valve 160. Also shown in FIG. 5 are three level sensors 176a, b and c that may be used to detect the level of material in the hopper 102. The upper level sensor 176a may be used to turn the first transfer pump 108 off when the hopper is full; the middle level sensor 176b may be used to turn the first transfer pump 108 on when material M can be added. The lower level sensor 176c may be used to shut down the feed center 100 (or that material application system) because there would be insufficient material M for coating operations.

Figure 6:
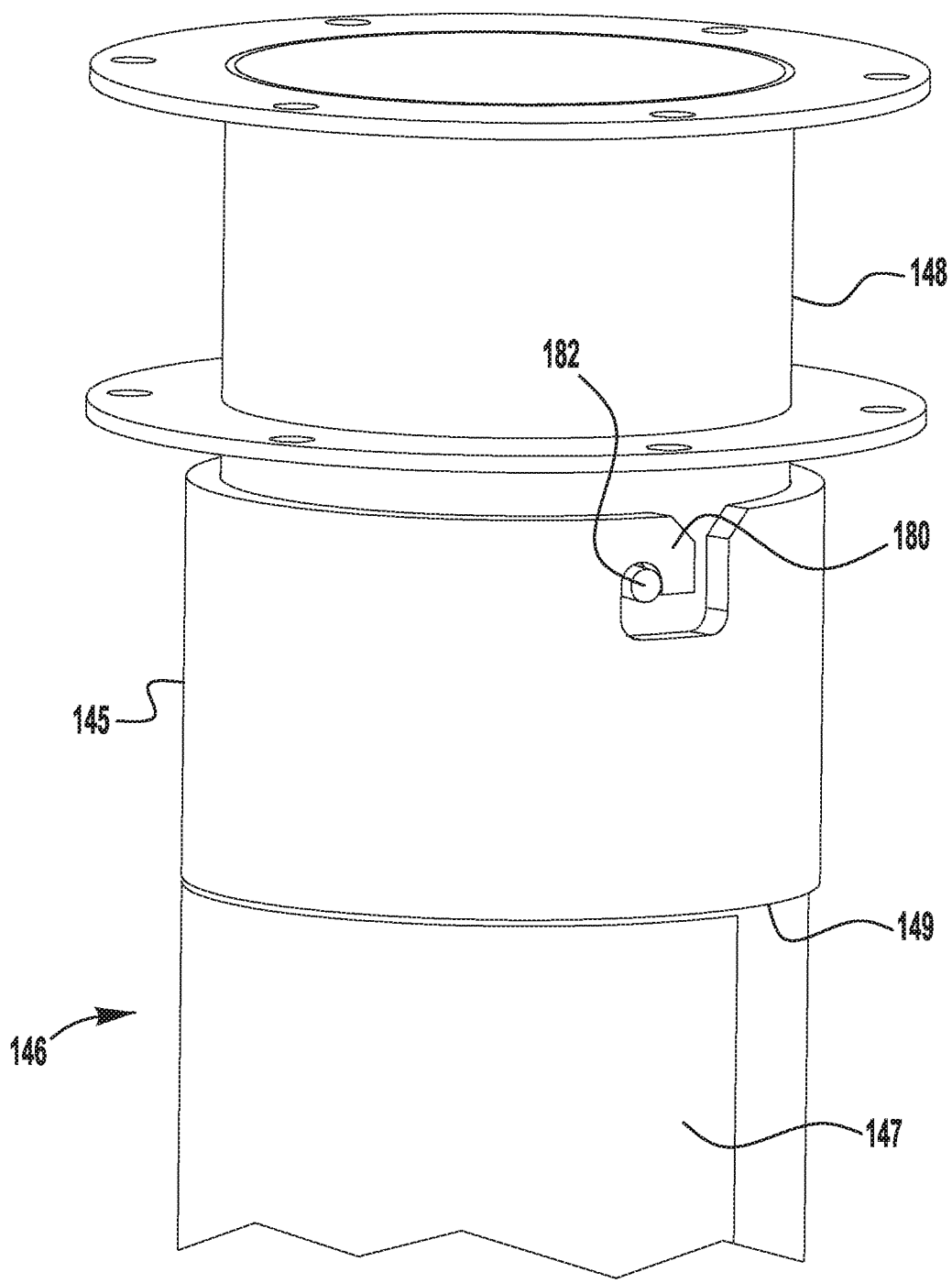
FIG. 6 is an enlarged view of the sleeve control valve of FIG. 4.

FIG. 6 shows the lower portion of the extraction duct 148 and the sleeve control valve 146 (also referred to herein as a sleeve valve for short.) The sleeve valve 146 may include a sleeve 145 that slip fits over the lower end of the extraction duct 148. FIG. 4 shows the sleeve 145 in a fully raised position. This allows the cap 172 to be swung up to its second cleaning position. The sleeve and extraction duct may include an interlocking arrangement to support and maintain the sleeve in a raised position. For example, as shown in FIG. 6, the interlocking arrangement may include a hook 180 on an upper end of the sleeve 145 that engages a pin 182 on the extraction duct 148. When engaged, the hook 180 supports and maintains the sleeve 145 in the raised position. In another exemplary embodiment (not shown), the sleeve valve may be secured to the extraction port of the hopper, and may be disengaged from the extraction duct by lowering the sleeve toward the hopper.

Figure 7:
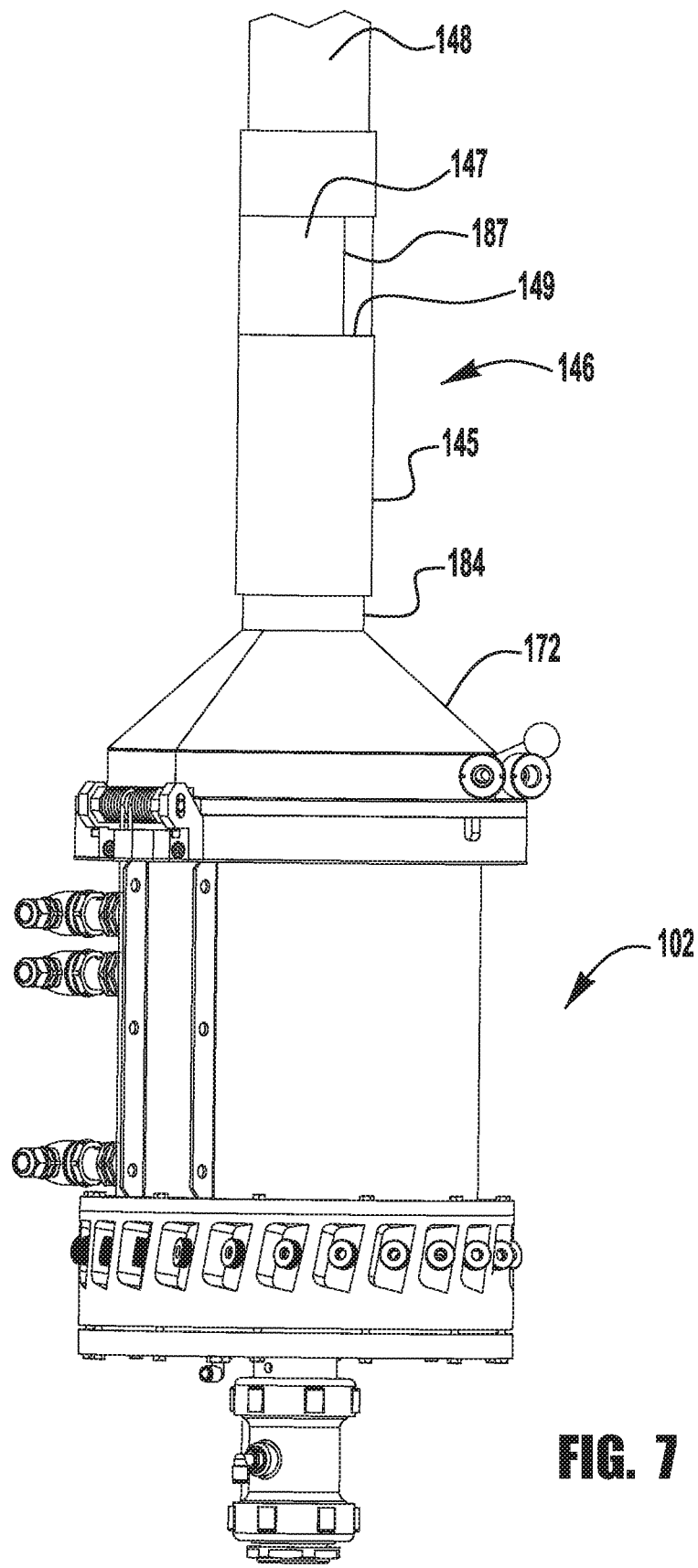
FIG. 7 shows the sleeve control valve of FIG. 4 in a closed position during a cleaning operation.
Figure 8:
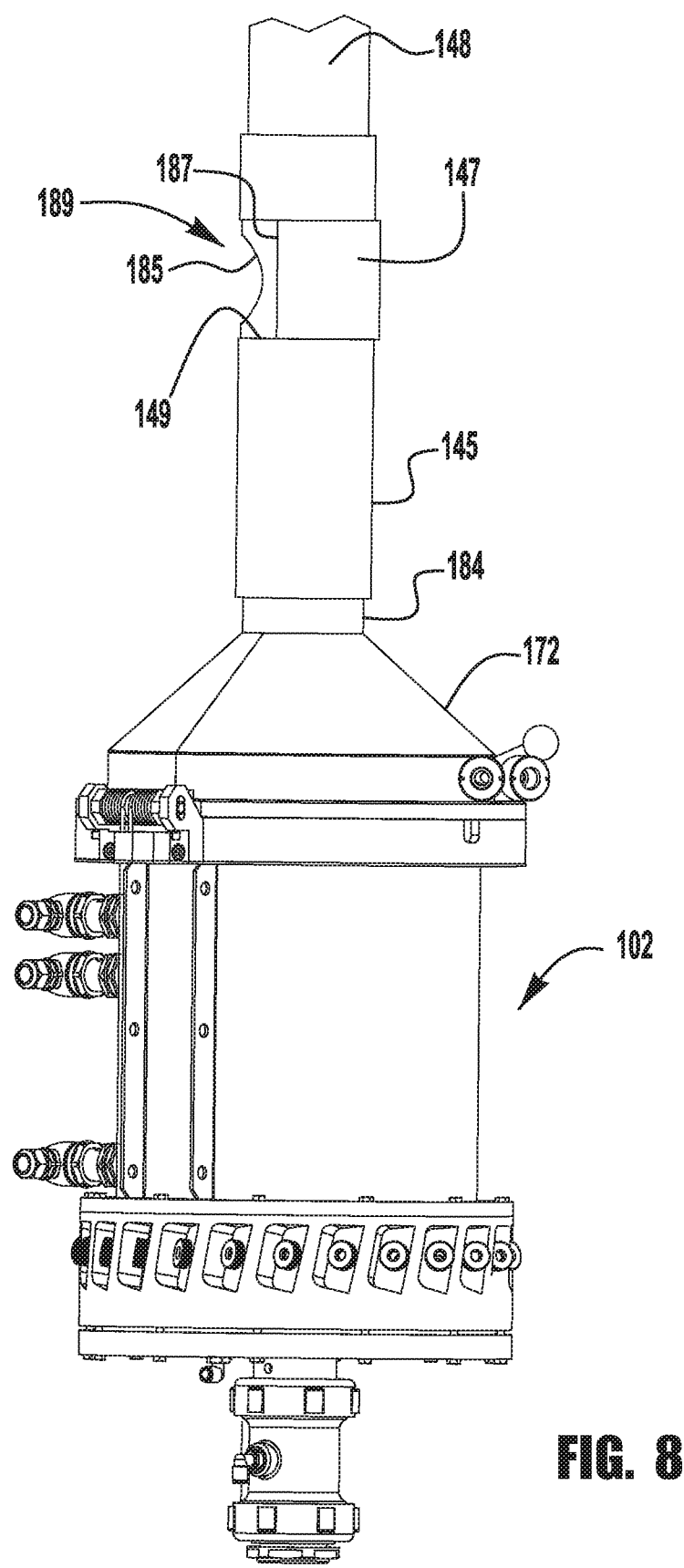
FIG. 8 shows the sleeve control valve of FIG. 7 in an open position during coating operations.

FIGS. 7 and 8 illustrate the sleeve valve 146 in a closed position and an open position respectively, but in both cases the sleeve 146 has been lowered to engage a tube or other such extraction port 184 on an upper portion of the cap 172. As shown in FIG. 5, the extraction port 184 is in fluid communication with the interior volume 186 defined by the cap 172 above the sieve 116. When the valve 146 is closed (FIG. 7) and engaged with the extraction port 184, the powder recovery system 28, (or alternatively, the waste collection system 130) (FIG. 2) can apply suction and draw powder from the hopper 102 as part of the cleaning operation. Powder can be drawn through the sieve 116, or the sieve 116 can be removed and separately cleaned, or both.

In an exemplary embodiment, as shown in FIGS. 7 and 8, the control valve 146 includes a first or primary sleeve 145 that is axially lowered and raised for connection and disconnection of the extraction duct with the hopper, as described above, and a second or secondary sleeve 147 that can be actuated to slide on the primary sleeve to operate the control valve between open and closed positions. In the open position, an opening 185 in the first sleeve 145 aligns with an opening 187 in the second sleeve 147 to create, form, or otherwise define the exterior port opening 189. In the closed position, the second sleeve opening 187 is moved out of alignment with the first sleeve opening 185 to block, close, or otherwise eliminate the exterior port opening 189. In the illustrated embodiment, the second sleeve 147 may rotationally slide on the first sleeve 145 between open and closed positions, and may be retained in a recessed track 149 in the first sleeve. In another exemplary embodiment (not shown), the second sleeve may axially or longitudinally slide on the first sleeve between open and closed positions, with the second sleeve covering an opening in the first sleeve in a closed position, and uncovering the first sleeve opening in an open position.

If suction has been shut off from the first extraction duct 148 (e.g., by one or more shutoff valves), the exterior opening 189 allows fluidizing pressurized air to exit the hopper, to maintain circulation of fluidizing air during the coating process. If suction is maintained at the first extraction duct 148, ambient air exterior to the hopper may be drawn in through the exterior port and into the extraction duct, thereby effectively breaking suction to the hopper, with only enough fluidizing air exiting the hopper to maintain ambient pressure within the hopper. As a result, powder material exterior to the hopper may be pulled into the extraction duct for delivery to the recovery system or the waste collection system. In some embodiments, suction from the first extraction duct 148 may be reduced (e.g., by partially closing a shutoff valve) to prevent or minimize any suction applied to the hopper.

The open position of the control valve 146 is therefore the position used for coating operations, to permit passage of fluidizing pressurized air through the hopper and/or to eliminate the application of suction into the hopper while the hopper is fluidizing powder for coating operations. The control valve 146 therefore has at least three distinct positions. In the first lowered or connecting position (FIG. 7) the first sleeve opening 185 is covered and this is the first cleaning position (control valve 146 is closed.) In the second connecting position (FIG. 8) the first sleeve opening 185 is uncovered and this is the coating operation position (control valve 146 is open). In the third or raised position (FIG. 4), the cap 172 can be raised or pivoted open for further cleaning of the hopper 102.

Figure 7A:
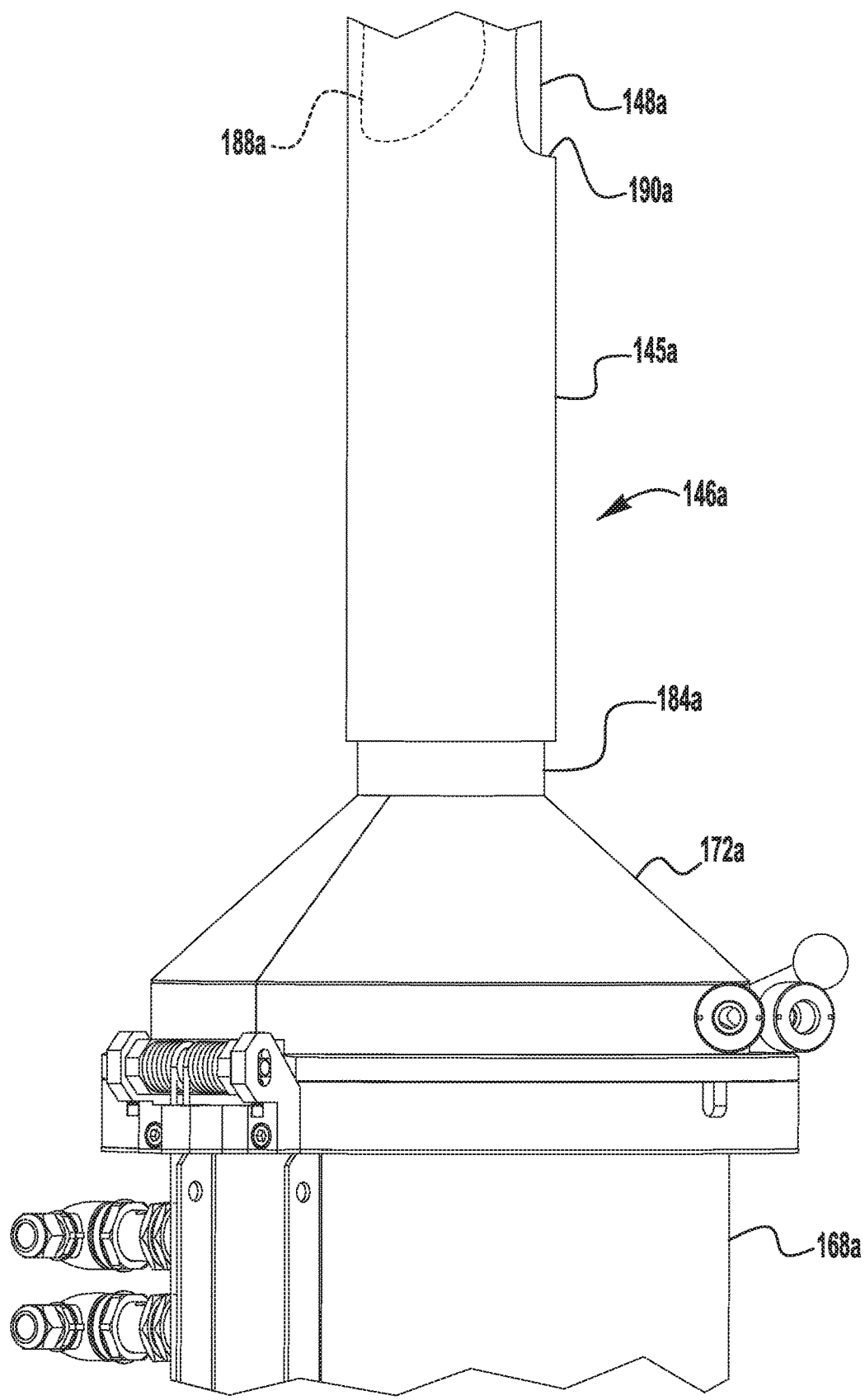
FIG. 7A shows another sleeve control valve in a closed position during a cleaning operation.
Figure 8A:
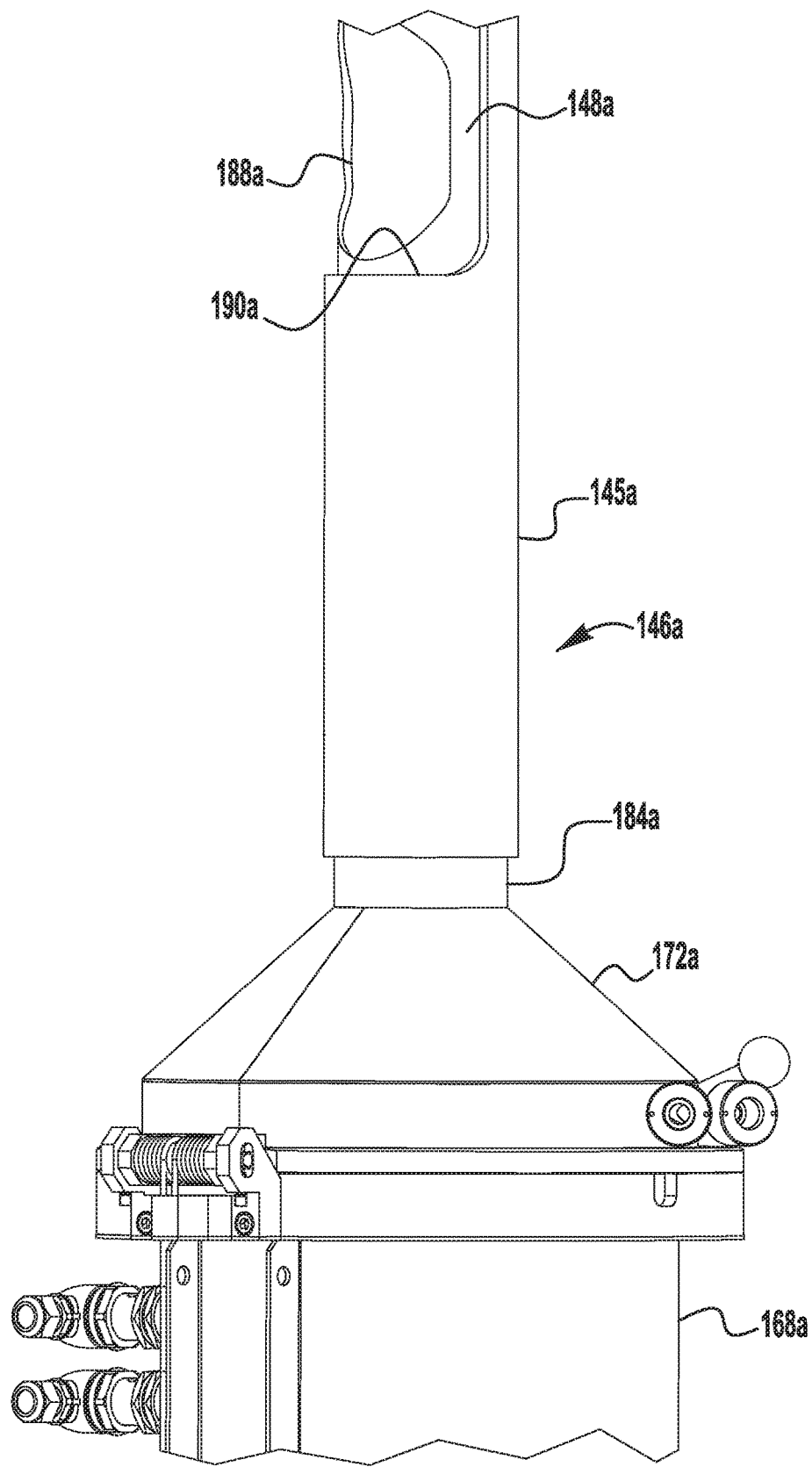
FIG. 8A shows the sleeve control valve of FIG. 7A in an open position during coating operations.

In another embodiment, as shown in FIGS. 7A and 8A, the extraction duct 148a includes an opening 188a that is opened and closed depending on the rotational position of the sleeve 145a. The sleeve 145a includes a complementary opening 190a. The exemplary sleeve 145a is not only able to be vertically or axially raised and lowered, but it can also be rotated about its longitudinal axis. In a closed position, the sleeve 145a covers the opening 188a in the extraction duct 148a because the sleeve opening 190a not in alignment with the opening 188a in the extraction duct, which allows suction to be applied to the interior volume of the cap 172a and the hopper cylinder 168a. Therefore, this is a first cleaning position for the sleeve 145a so that the bulk of the powder can be removed and recovered by the recovery system. In a second rotated position, the sleeve opening 190a can be aligned with the extraction duct opening 188a to define an exterior port opening 189a.

As described above, the exterior port opening may provide an exit for pressurized fluidizing air pumped into the hopper when the suction source is blocked or eliminated. The pressurized fluidizing air exiting the control valve may carry powder coating material particles. While the exiting powder coating material particles may be permitted to remain in the feed center enclosure 208 until a cleaning operation after conclusion of the coating process, in another embodiment, an additional extraction duct may be arranged to pull powder coating material away from the exterior port opening, for delivery of the exiting powder coating material to a waste or recovery system as described above.

FIGS. 3 and 8 illustrate a second extraction duct or tube 230 that extends into the feed center enclosure 208 proximate the exterior port opening 189. A gap or space may be provided between the end of the extraction duct 230 and the exterior port opening 189, such that the negative pressure or suction pulled by the extraction duct 230 is not directly applied to the hopper 102. Instead, the suction of the extraction duct 230 is sufficient to only (or at least primarily) pull in or capture at least some of the powder coating material that has exited the hopper 102 and the control valve 146. The second extraction duct may be in fluid communication with the same suction source as the first extraction duct 148. In another exemplary embodiment, the first extraction duct may be in fluid communication with a suction source of a waste collection system, and the second extraction duct 230 may be in fluid communication with a suction source of a material recovery system 28, for example, to re-circulate the material back to the hopper 102.

Many different types of suction sources or vacuum generators may be used to recover powder coating material exiting the control valve 146. In an exemplary embodiment, the suction source includes an air amplifier 260 supplied with pressurized air from a vertical support tube 262 and a connecting elbow 264. The air amplifier may be configured to provide a steady suction draw (e.g., about 25 cfm), with a periodic pulse of increased suction draw (e.g., about 150 cfm), for example, to evacuate powder coating material that has settled in the second extraction duct.

To prevent suction of the exiting powder coating material into the first extraction duct 148, for example, during a coating operation, a shutoff valve may be provided between the first extraction duct 148 and the suction source. During the coating operation, the shutoff valve may be maintained in a closed position. During a cleaning operation, the shutoff valve may be opened to apply suction to the hopper (e.g., at about 800 cfm) through the first extraction duct 148 and the closed (i.e., blocked exterior port) control valve 146. In the illustrated embodiment, a shutoff valve 240 (e.g., a butterfly valve) is assembled to the first extraction duct 148 above the feed center enclosure 208. Additionally, a second valve 242 (e.g., a butterfly valve) may be provided between the enclosure extraction duct 128 and the suction source. In the illustrated embodiment, the second valve may be partially closed during the coating operation to apply dampened suction forces (e.g., about 800 cfm) to the interior of the feed center enclosure, for example, for extraction of powder expelled into the enclosure 208 by the vibrating container B without applying the full suction (e.g., about 1800 cfm) of the cleaning operation. While the valves 240, 242 may be manually operated when changing between coating and cleaning operations, in the illustrated embodiment, the valves 240, 242 are provided with pneumatically actuated linkage mechanisms 241, 243 to automatically operated the valves when changing operations of the feed center.

In some systems, the second extraction duct 230 may be used selectively during coating operations, for example, depending on whether the user desires to recover the expelled powder coating material. For example, during short or limited coating operations in which recovery of expelled powder is not desired, the second extraction duct may be inactive (e.g., by turning off or blocking the suction source provided for the second extraction duct) and the suction source provided for the first extraction duct may be maintained, by keeping the shutoff valve 240 in at least a partially open position. As a result, powder coating material exiting the hopper through the extraction port will be pulled into the first extraction duct 148 for delivery to the waste collection system. During longer or extended coating operations (or where the powder coating material is more costly) in which recovery of expelled powder is desired, the second extraction duct may be active (e.g., by turning on or opening the suction source provided for the second extraction duct) and the suction source provided for the first extraction duct may turned off or blocked by closing the shutoff valve 240. As a result, powder coating material exiting the hopper through the exterior opening 189 will be pulled into the second extraction duct 230 for delivery to the recovery system.

Figure 9:
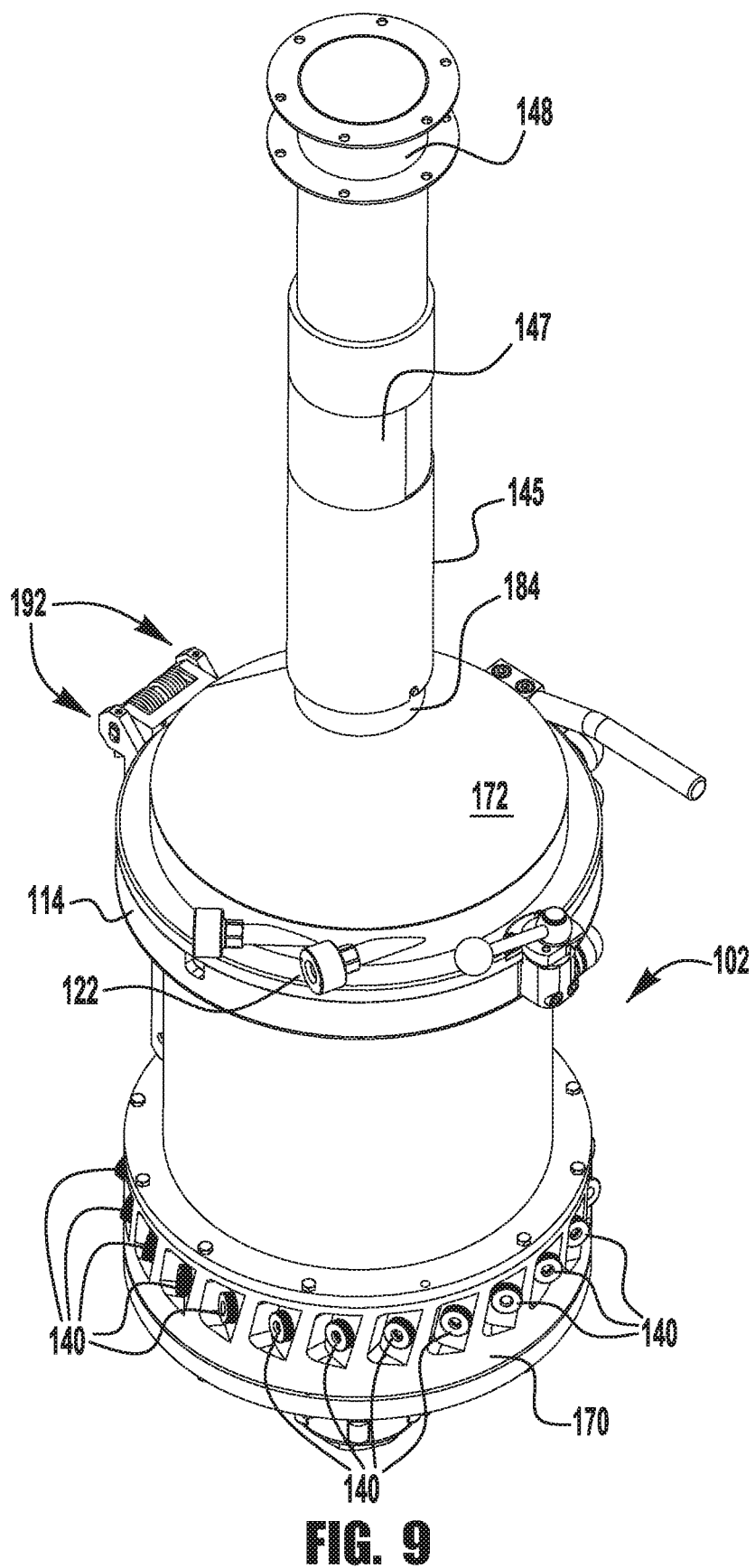
FIG. 9 is an enlarged perspective of the hopper of FIG. 4.

FIG. 9 shows the hopper 102 with the cap 172 closed or lowered. The powder ring 170 includes the plurality of powder outlet ports 140 that get connected to the gun pumps 144 (FIG. 2.) Two powder inlet ports are also provided in the cap 172, including the virgin powder inlet port 114 and the reclaim powder inlet port 122. Preferably but not necessarily each powder inlet port 114, 122 provides a tangential entry into the interior volume 186 of the cap 172 above the sieve 116. This produces a swirling action of the material within the cap 172 to assist the sieve 116. The sieve 116 may be an ultrasonic sieve, such as available commercially from Artech in Switzerland, but other ultrasonic sieves may also be used as appropriate. The hinge connection 192 of the cap 172 to the cylinder 168 is also shown in FIG. 9.

Figure 10:
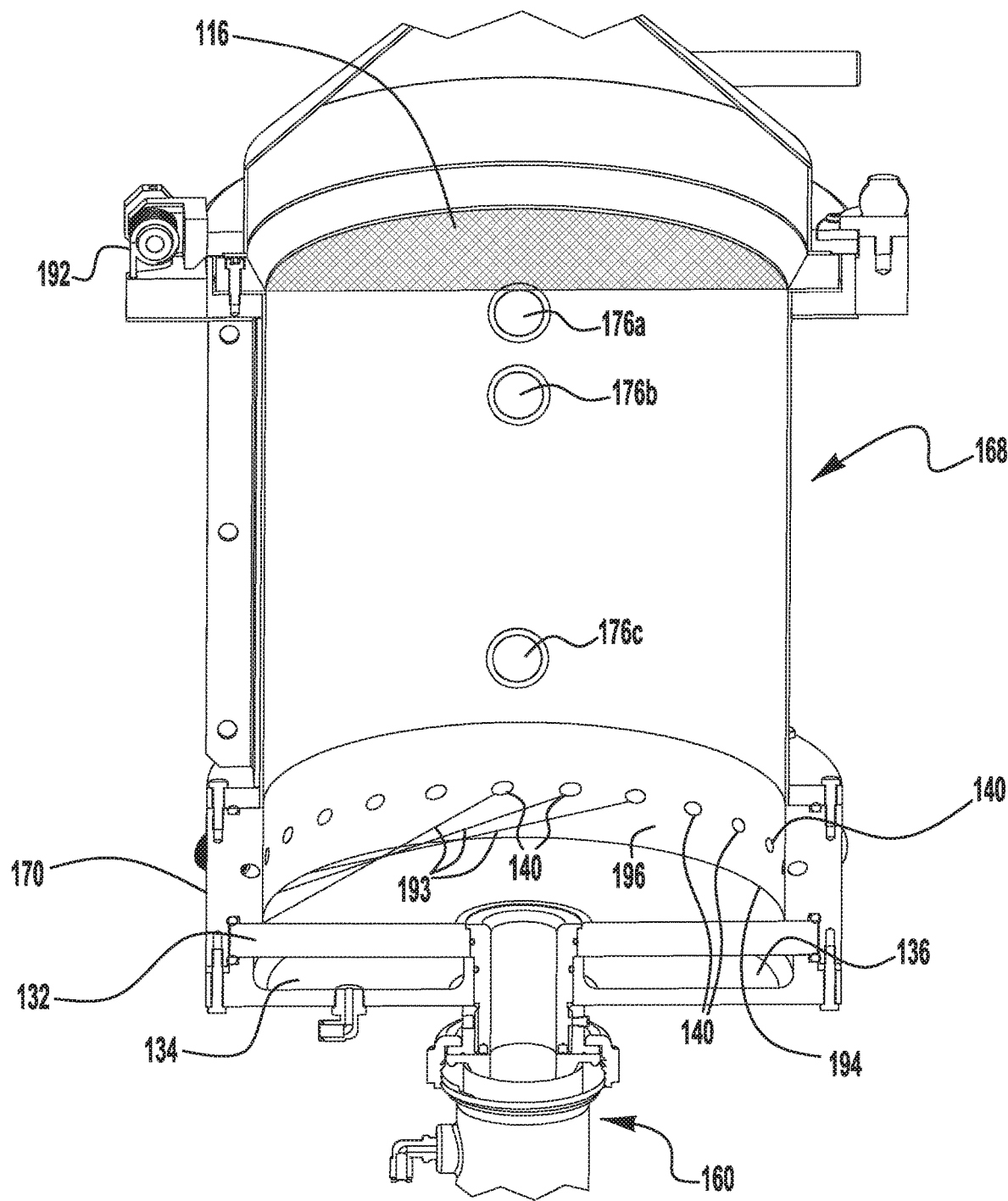
FIG. 10 is a longitudinal cross-section of the hopper of FIG. 4.

Each of the powder outlet ports 140 is formed with a compound angle such that each port 140 opens to the interior volume 186 of the cap 172 aimed downward and near tangentially. This is best represented in FIG. 10 with the direction lines 193 added to show the directional angle of the ports 140. In this way, when the gun pumps 144 are operated in reverse so as to apply purge air into the hopper 102 through the ports 140, the pressurized air is directed downward and towards the corner 194 between the powder ring 170 interior wall surface 196 and the top surface of the fluidizing plate 132. The powder ring 170 is circular, and the plurality of ports 140 are evenly spaced around the interior circumference of the ring 170, so that the compound angle of the ports 140 has the net effect of sweeping the corner 194 about the entire internal circumference of the powder ring to remove material that could become trapped in the corner area.

Figure 11:
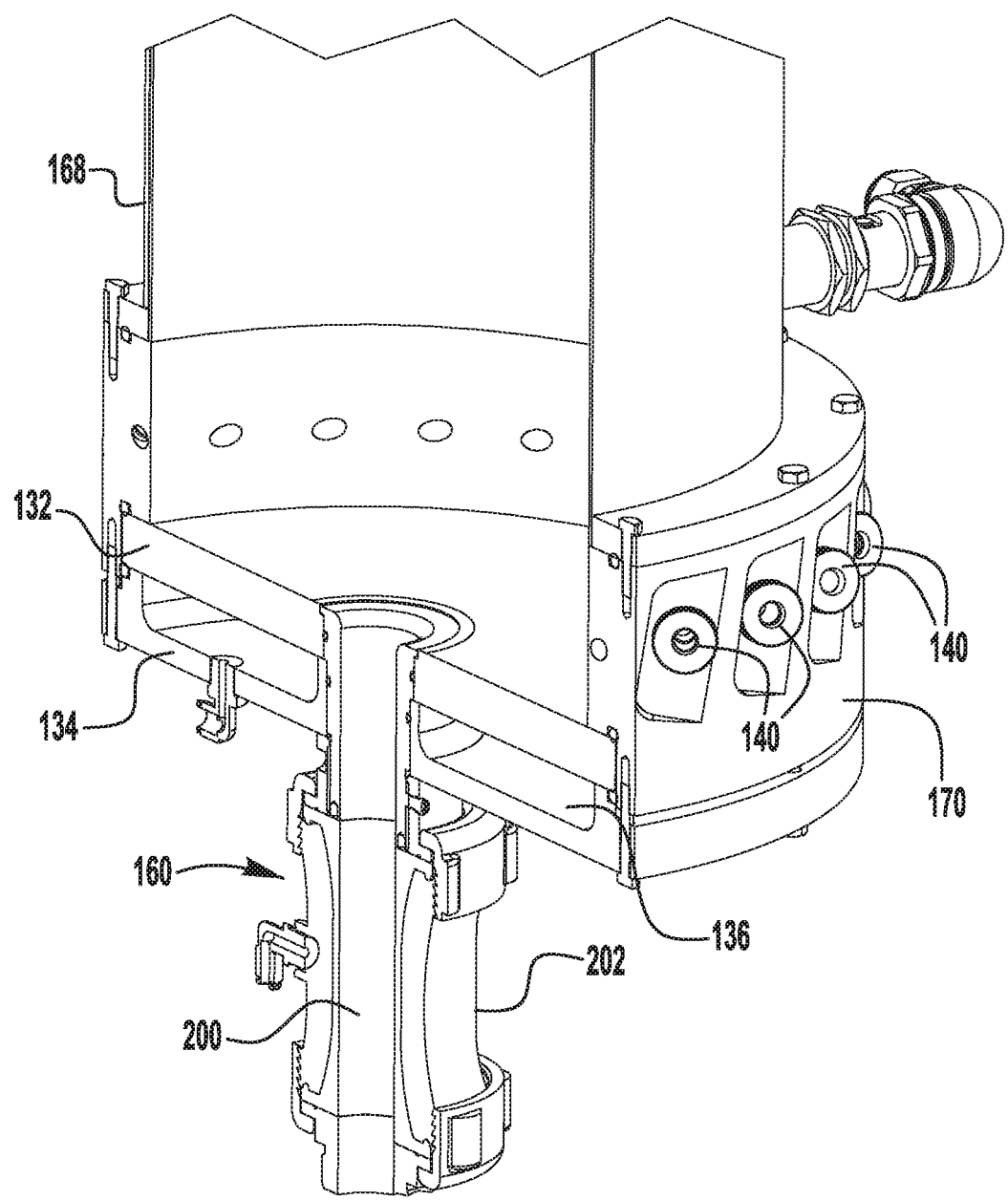
FIG. 11 is another cross-section of the hopper of FIG. 4 showing a discharge valve in more detail.
Figure 12:
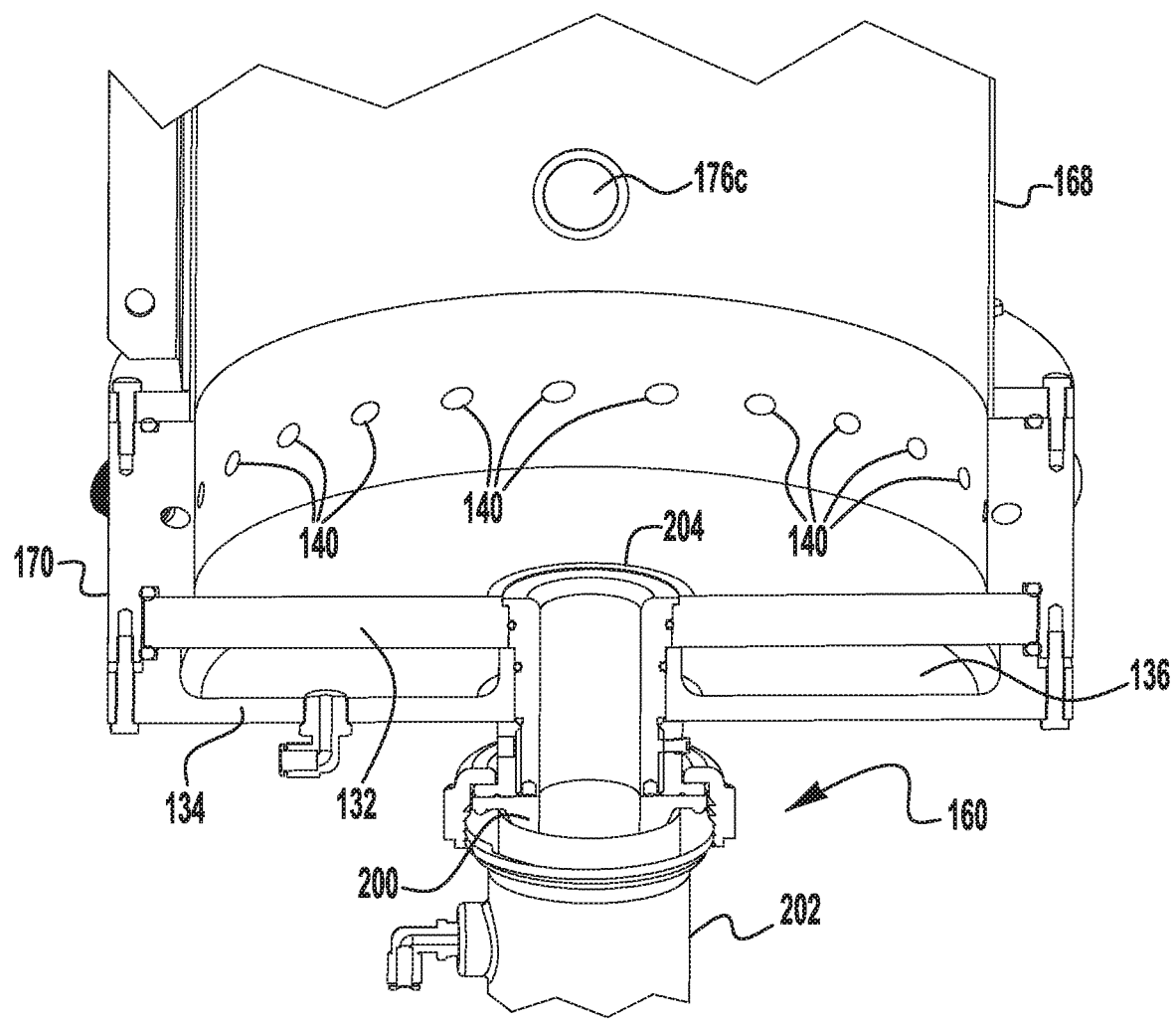
FIG. 12 is another enlarged view of the illustration of FIG. 10 showing powder ports with compound angles.

FIGS. 11 and 12 further show the compound angle of the ports 140. FIG. 11 also shows in cross-section the discharge valve 160. In an embodiment, the discharge valve 160 may be realized in the form of a pneumatic pinch valve having a flexible hollow pinch valve member 200 that is disposed in a sealed pressure chamber 202. When pressurized air is introduced into the pressure chamber 202 the pinch valve member 200 is pinched closed. When the pressure is vented, the pinch valve member opens due to the natural resilience of the material, which may be rubber for example. The pinch valve member 200 is in fluid communication through an adapter 204 with the interior volume of the powder ring 170 above the fluidizing plate 132 so that material can be dumped out of the hopper 102 when the discharge valve 160 is open.

Figure 13:
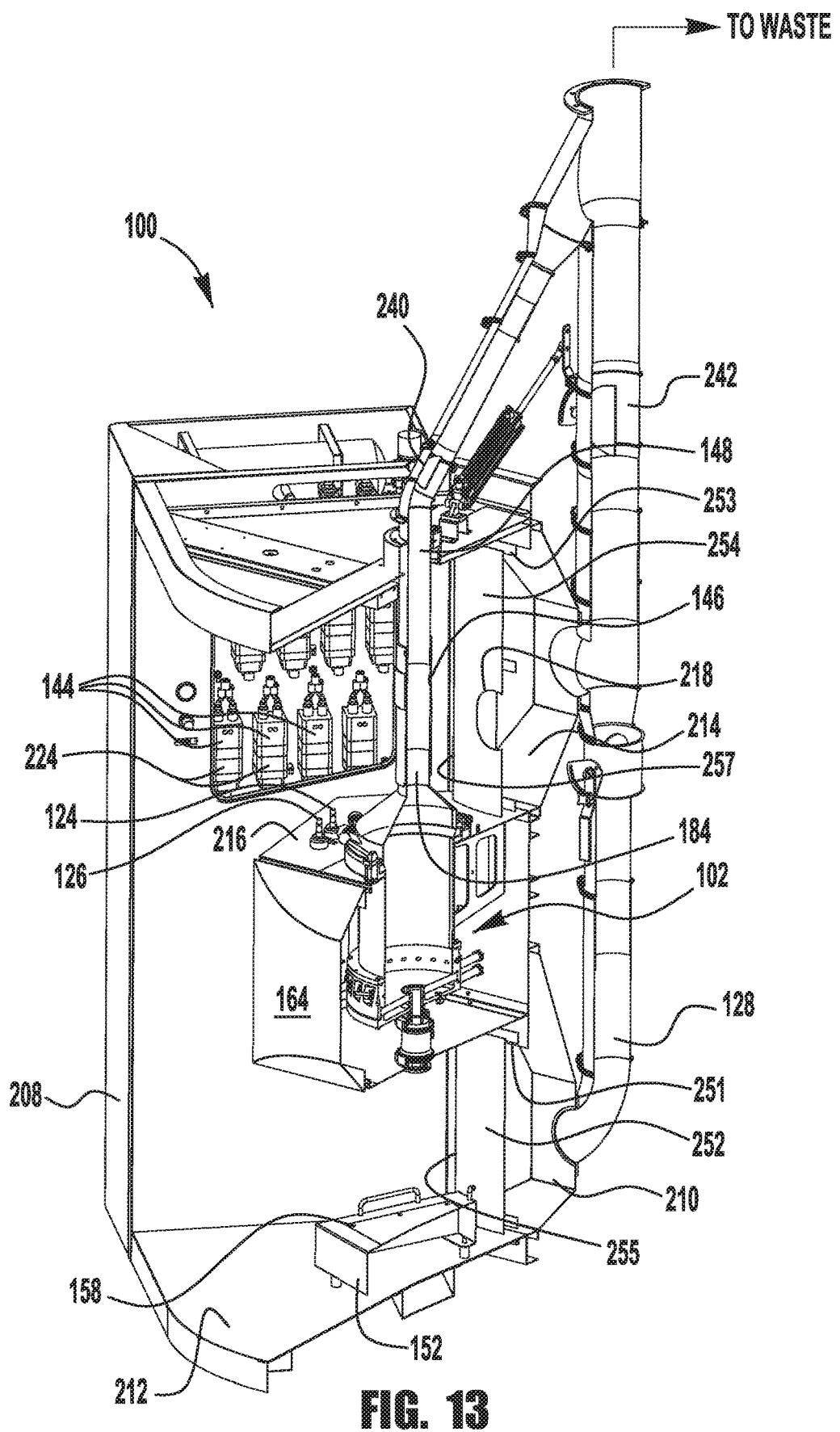
FIG. 13 is a partial cross-section view of the feed center of FIG. 3.
Figure 16:
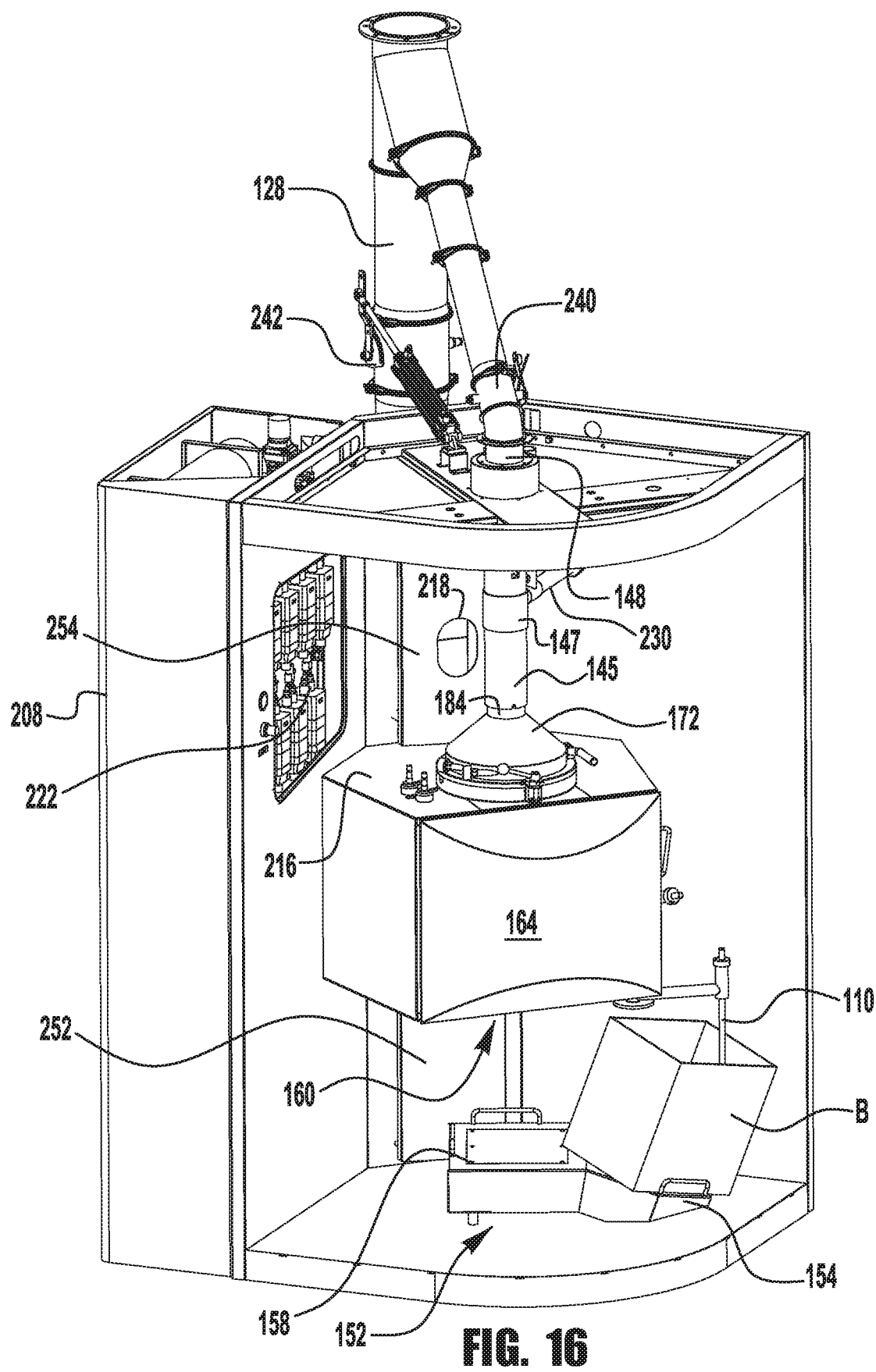
FIG. 16 is another illustration of the feed center of FIG. 3 to show vertical duct inlets.

FIG. 13 (see also FIG. 16) illustrates an embodiment of the enclosure extraction duct 128. The enclosure extraction duct 128 may be located behind, and may be partially defined by, an internal surface or wall 206 that forms part of the feed center support structure or enclosure 208 (FIG. 3.) FIG. 13 is shown in partial longitudinal section to reveal the duct 128. The enclosure extraction duct may have a plurality of inlet portions, and the enclosure extraction duct 128 may be under negative pressure or suction from the after filter and waste collection system 130 (FIG. 2). A first duct inlet portion 210 may be provided near the floor 212 of the feed center enclosure 208 to pull powder in that may have fallen to the floor and also to create a downward air movement to help pull airborne powder particles out of the enclosure 208. A second duct inlet portion 214 may be provided that is about flush with an upper surface 216 of the hopper housing 164. This may be a useful location when the cap 172 is in a raised position to allow an operator to clean off the sieve by removing the sieve and using an air wand or other means, as well as to clean off the flat upper surface 216. The duct inlet portions 210, 214 may extent rearward into a vertically extending portion of the enclosure extraction duct 128.

The second duct inlet portion 214 may be provided with a circular or other shape aperture 218 that receives or aligns with an end portion of the extraction port 184 of the cap 172. When the cap 172 is in the raised or pivoted open position, as in FIG. 14 (also compare with FIG. 15), the end portion of the extraction port 184 is facing and may be received in the duct aperture 218. This allows an operator to clean off the interior of the cap 172 and may also be used if the sieve 116 is separately cleaned. It should also be noted that the pump purge connections 124, 126 may also be in fluid communication with the enclosure extraction duct 128 through hoses that are routed within the housing 164 interior space.

While inlet portions in the enclosure extraction duct may be provided in a variety of configurations, in the illustrated embodiment, the inlet portions are defined by one or more panels 252, 254 secured over apertures 251, 253 in the enclosure wall 206, and spaced apart from the wall surface to define gaps 255, 257 adjacent to the apertures. These gaps may provide elongated vertical and horizontal slot-like duct inlets oriented to draw in powder coating material (or other particulate) that would otherwise collect in corners and edges within the enclosure. In an exemplary embodiment, the panels 252, 254 may be secured to the enclosure wall 206 by fasteners that are adjustable to provide a variable offset between the panel and the enclosure wall to adjust the gap width, for example, to increase suction flow velocity (by narrowing the gap) or to increase the area through which the powder coating material may be pulled (by widening the gap).

With reference again to FIG. 14, as noted hereinbefore, one or more gun pumps (144 in FIG. 2, 402 in FIG. 1) may be used with the hopper 102 to supply powder coating material to a respective spray gun 20 (FIG. 1.) In an embodiment of another inventive concept presented herein, one or more of the gun pumps 144 may be supported on a wall 220 of the feed center enclosure 208, and behind a clear transparent panel 222. This allows the gun pumps 144 to be observed during operation, particularly for an embodiment in which the gun pump 144 includes a transparent pinch valve body 224. The transparent panel 222 may be mounted flush with an interior panel 226 of the enclosure 208 preferably to form a continuous surface that is easy to clean with an air wand, for example. The powder removed from the interior surfaces may be drawn into the enclosure extraction duct 128 through any of the inlets 210, 214, 218.

Figure 14:
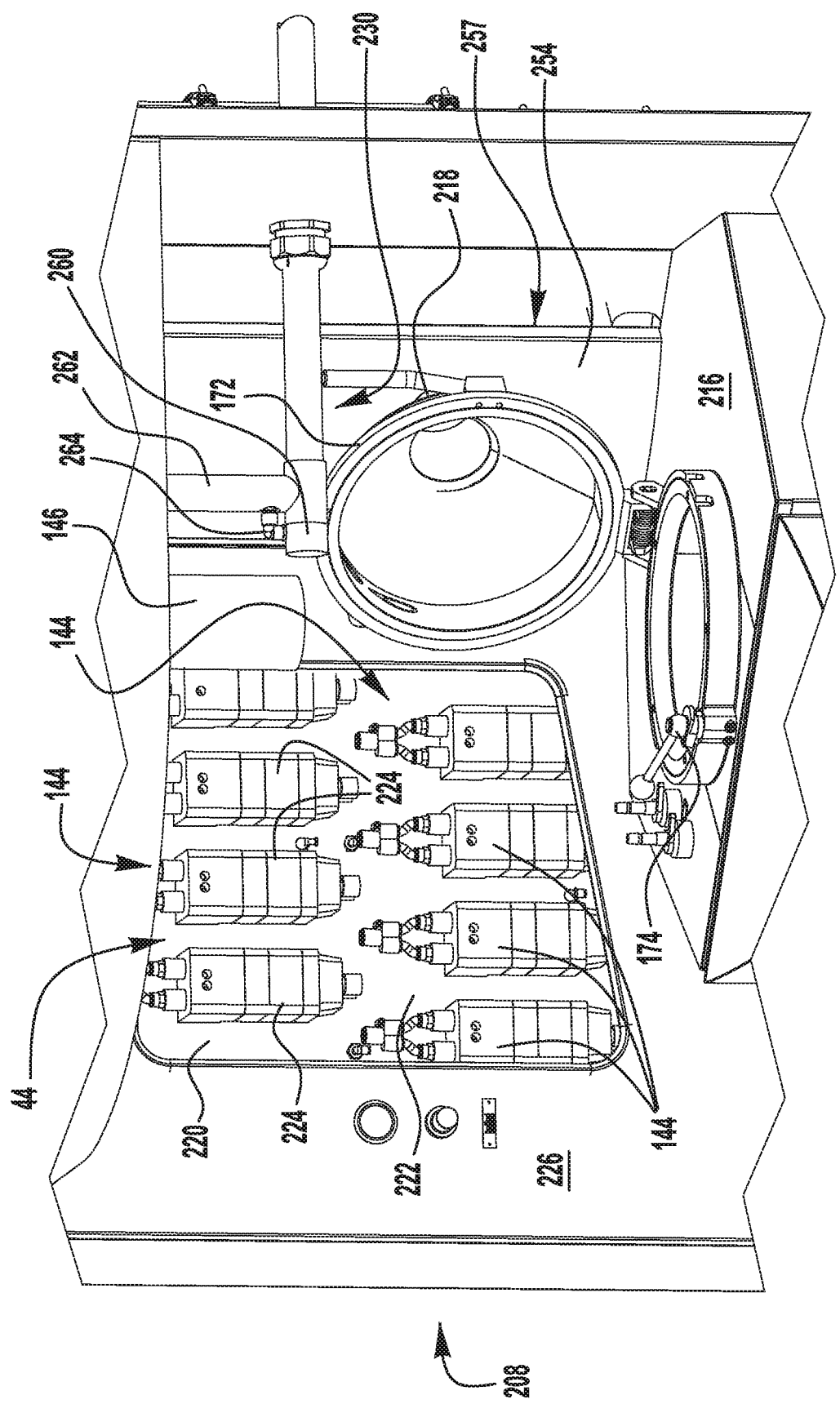
FIG. 14 is an enlarged view of an upper portion of the hopper of FIG. 4.
Figure 15:
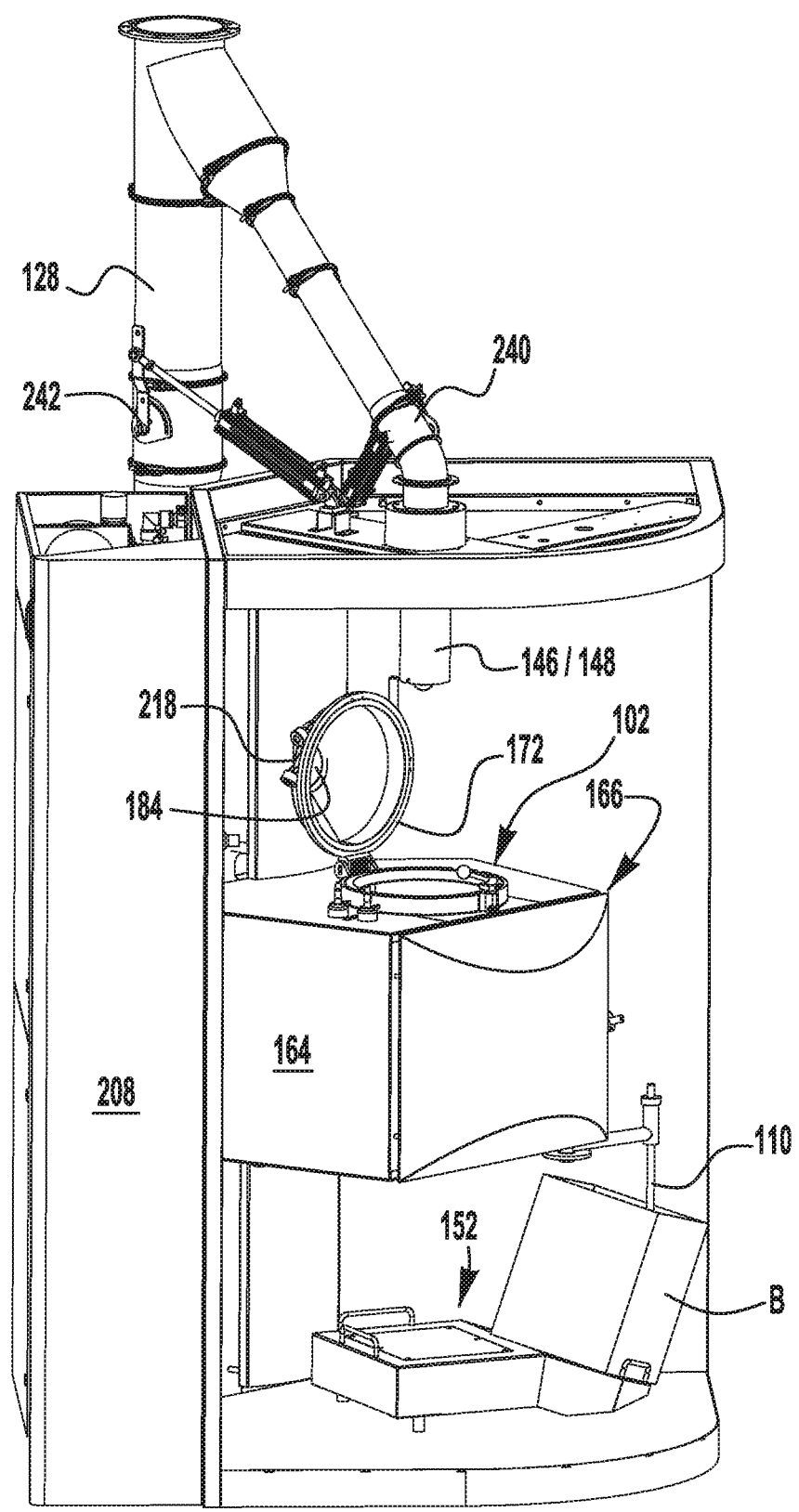
FIG. 15 is a partial side view of the feed center of FIG. 3.

As another optional embodiment, each gun pump 144 may be illuminated while the gun pump is operating. For example, a light source (not shown) may be positioned as appropriate to illuminate the transparent pinch vale body 224. For example, an LED or other suitable lamp may be used to illuminate the associated gun pump 144. The gun pumps 144 may be illuminated with different colors, different intensity, or different flashing (or non-flashing) conditions that may optionally encode various performance conditions. For example, if the gun pump is illuminated steadily with a blue light it may indicate the pump is running normally and within specification. A blinking illumination may be used as a warning indicator that one or more operating parameters of the gun pump is out of range or specification. No illumination may be used to indicate the pump is off or has been interrupted due to a possible operational problem. As another alternative, different color lights may be used. For example, blue could indicate normal operation, yellow used as a warning indicator and red used to indicate a problem requiring immediate attention. Many different embodiments may be used as visual indications as to the pump status. Another example of pump status may be to indicate status as to air pressure and/or air flow that is used to operate the pump pinch valves. Another example would be to indicate status of airflow used to pull powder into a pump chamber and air flow used to push powder out of the pump chamber. FIG. 14 illustrates all the gun pumps 144 in an illuminated condition.

Figure 17:
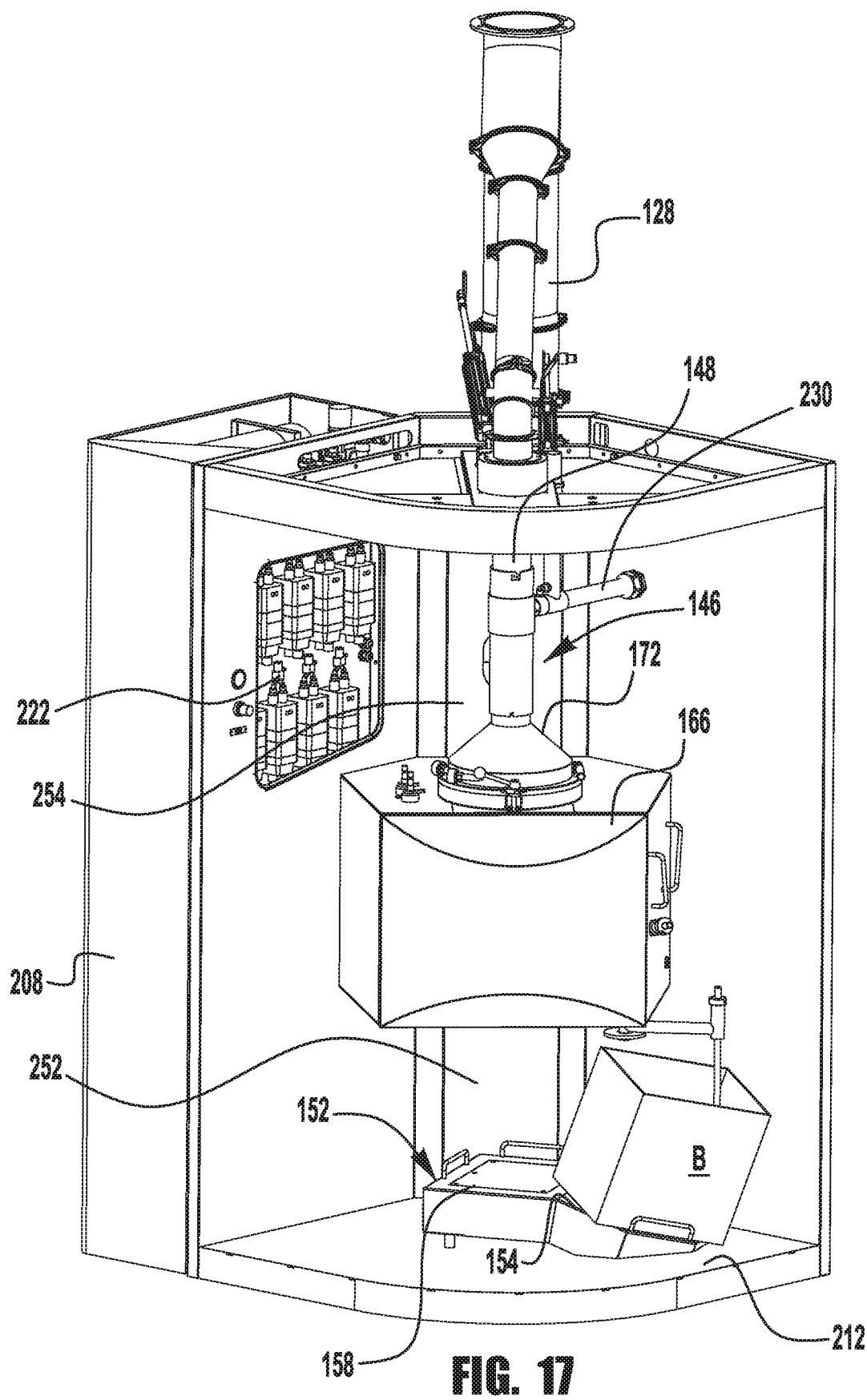
FIG. 17 is a front elevation of the feed center of FIG. 3.

An exemplary cleaning operation will now be described. First assume that the feed center 100 is in the position of FIG. 17 in which a coating operation has been completed and the container B has been moved to the flat support surface 158 of the platform 152. The cap 172 is in the closed position and the sleeve valve 146 is still open meaning that the exterior opening 189, 189a is provided (by alignment of the second sleeve opening 187 with the first sleeve opening 185 in the embodiment of FIGS. 7 and 8, or alignment of the sleeve opening 190a with the first extraction duct opening 188a in the embodiment of FIGS. 7A and 8A). The suction tube 110 is connected to the third purge inlet 125 (FIG. 3). The spray guns may be purged and the powder recovery system is operational. The discharge valve 160 is opened to dump powder from the hopper 102 to the container B. The box can be weighed and then removed and the discharge valve 160 closed. Then the gun pumps 144 may be soft purged (e.g., a slow build to about 40 psi over about 10 seconds) back into the hopper 102, for example, to more effectively discharge powder that has settled in the hoses. Next the virgin supply hose 112 is moved to the first purge inlet 124 and the reclaim supply hose 120 is moved to the second purge inlet 126. The tangential inlets 114 and 122 may be plugged. The sleeve valve 146, 146a is closed (by rotating the second sleeve so that the second sleeve opening 187 is not aligned with the first sleeve opening 185 in the embodiment of FIGS. 7 and 8, or by rotating the sleeve 145a so that the sleeve opening 190a is not aligned with the first extraction duct opening 188a in the embodiment of FIGS. 7A and 8A), in order to cover or close off the exterior port opening 189, 189a. This allows suction to be applied to the interior of the hopper 102 via the waste collection system 130 or the powder recovery system 28. Then the pumps may be hard purged (e.g., at about 40 psi) back to the hopper 102 and the transfer pumps 108, 118 may be hard purged into the enclosure extraction duct 128. The sleeve 145 is then raised to allow the cap 172 to be raised or rotated to the position such as in FIG. 3. In the raised position, the extraction port 184 of the cap aligns with the third inlet 218 to the enclosure extraction duct 128. The cap 172 can be cleaned off by blowing powder through the third duct inlet 218 and the sieve 116 can be removed and cleaned. The sieve 116 may also be cleaned by leaving it in place while the sleeve valve 146 is in the closed position. The interior surfaces of the feed center enclosure 208 may also be blown off with the powder being collected into the enclosure extraction duct 128 through the inlets 210, 214 and 218.

Figure 18:
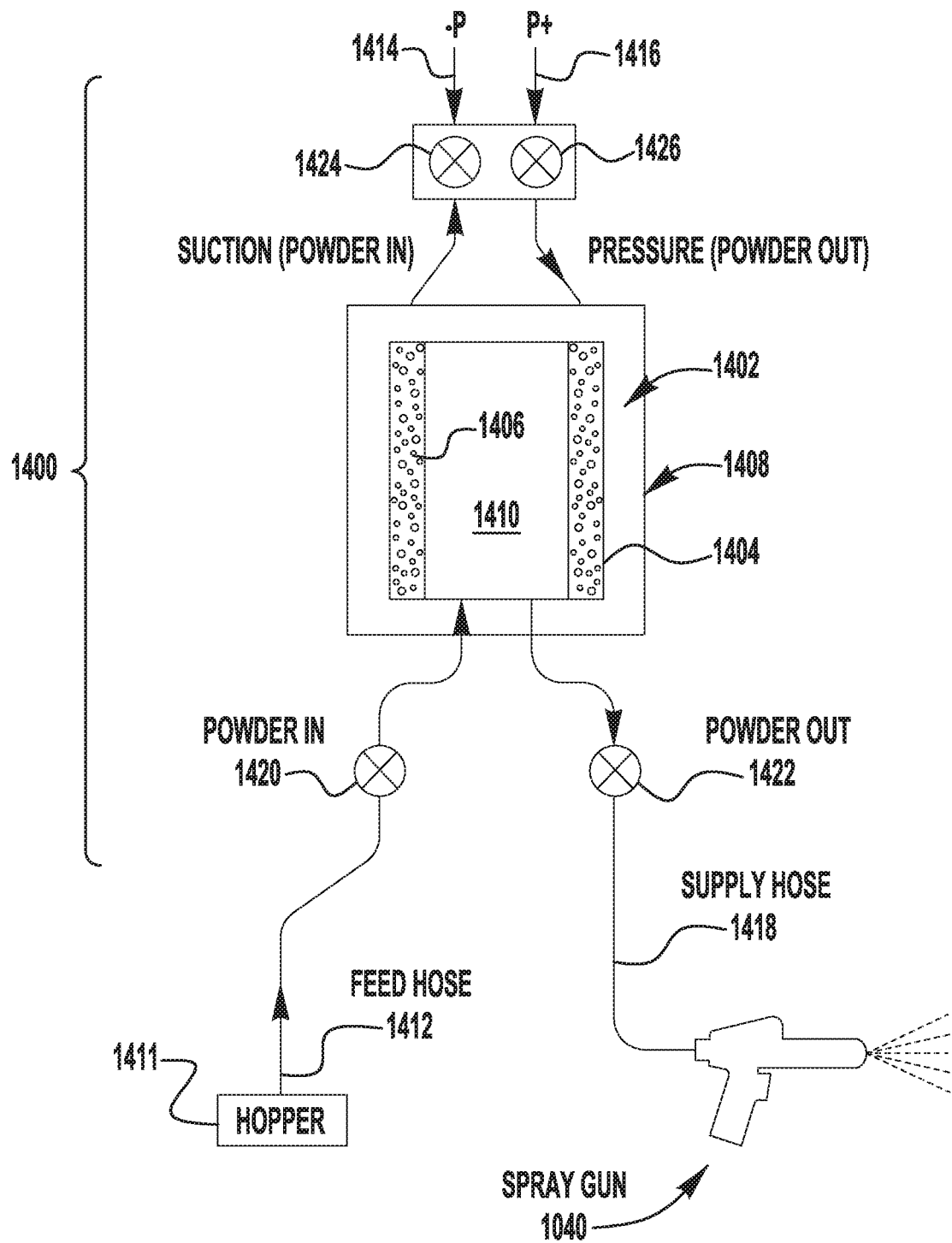
FIG. 18 is a schematic drawing of an exemplary dense phase pump that may be used with the present inventions.

We have referred to a dense phase powder pump in the above disclosure, which are also commonly known as high density powder pumps. There are many different dense phase pumps available commercially, and one such pump is described in U.S. Pat. Nos. 7,997,878; and 7,150,585, the entire disclosures of which are fully incorporated herein by reference. With reference to FIG. 18, an exemplary dense phase pump 1400 may use at least one or more pump chambers 1402 in the form of a hollow cylinder 1404 made of an air porous material 1406. The material 1406 for the pump chamber 1402 may be but need not be similar to the air diffuser (e.g., sintered polyethylene) described in International patent application number PCT/US2013/029607, filed on Mar. 7, 2013, the entire disclosure of which is incorporated herein by reference. Each pump chamber 1402 is disposed in a pressure chamber 1408 such that powder is drawn into a pump chamber volume 1410 from a powder supply 1411 through a feed hose 1412 when the pressure chamber 1408 has negative pressure applied from a vacuum source 1414, and powder is pushed out of the pump chamber 1408 to a supply hose 1418 when positive pressure is applied from a pressure source 1416 to the pressure chamber volume 1410. Control of powder into and out of the pump chambers may be accomplished with powder flow control valves, for example, pneumatic pinch valves 1420 (powder in) and 1422 (powder out) respectively, which open and close out of phase with respect to each other as is known. Pressure control valves, for example vacuum control valve 1424 and positive pressure control valve 1426 may also be used to control the timing of when negative and positive pressure cycles occur. The low flow air for dense phase powder flow arises from the use of pressure to move the powder, as opposed to high velocity air as used in a dilute phase powder pump such as a Venturi pump. Different dense phase powder pump designs may produce powder flows that vary in the powder/air ratio or in other words how rich the powder flow is into the spray gun, and similarly different Venturi pump designs may produce different levels of lean powder flows. For this reason we do not limit the disclosure herein to a definition of what is dense phase versus dilute phase. But a dense phase powder flow will typically be used with smaller diameter or cross-sectional powder flow paths as compared to a dilute phase powder flow path due to the lower flow air volume in the powder flow. The schematic of FIG. 18 shows an embodiment of the inventive concept of a hybrid spray gun 1040 that uses a dense phase powder flow into the spray gun and sprays the powder from a dilute phase front end.

While various aspects and features and concepts of the inventions are described and illustrated herein as embodied in various combinations in the exemplary embodiments, these various aspects, features and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices and so on may be described herein, such descriptions are not intended to be a complete or exhaustive list of available alternative embodiments, whether presently known or later developed. Those skilled in the art may readily adopt one or more of the aspects, concepts or features of the various inventions into additional embodiments within the scope of the present inventions, even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments and inventions described herein.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof

What is claimed is:

1. A feed center for a powder coating material, the feed center comprising:
a hopper in fluid communication with a fluidizing pressure source;
an enclosure surrounding the hopper; and
an extraction duct in fluid communication with at least one suction source to pull powder coating material exterior to the hopper into the extraction duct for cleaning the enclosure,
wherein the extraction duct is at least partially defined by an internal surface of the enclosure and a panel secured over an aperture in the internal surface of the enclosure, the panel being spaced from the internal surface of the enclosure to define a gap for receiving the powder coating material into the extraction duct.

2. The feed center of claim 1, comprising at least one duct inlet portion that is open to the extraction duct and configured to receive powder from within the enclosure into the extraction duct.

3. The feed center of claim 2, wherein the at least one duct inlet portion comprises a duct inlet portion that is disposed adjacent a floor of the enclosure such that the duct inlet portion is configured to pull powder into the extraction duct that may have fallen to the floor.

4. The feed center of claim 2, wherein the at least one duct inlet portion comprises a duct inlet portion that is disposed adjacent to an upper surface a housing of the hopper.

5. The feed center of claim 1, comprising a suction source in fluid communication with the extraction duct such that the suction source is configured to apply a suction force to the extraction duct.

6. The feed center of claim 1, comprising a valve that is configured to selectively open and close the enclosure extraction duct to a suction source.

7. The feed center of claim 1, comprising an extraction duct that is connectable to the hopper such that the extraction duct is in fluid communication with an interior volume of the hopper.

8. The feed center of claim 1, wherein the hopper includes a cap that is pivotable from a closed position to an open position.

9. The feed center of claim 7, comprising an extraction duct, and wherein the cap defines an extraction port, and the cap is pivotable from the closed position to the open position when the extraction port is disconnected from the extraction duct.

10. The feed center of claim 8, comprising a duct inlet portion having a duct aperture that is open to the extraction duct, and when the cap is in a raised or pivoted open position, an end portion of the extraction port is facing or received in the duct aperture.

11. The feed center of claim 1, wherein the hopper comprises at least one outlet port in an outer wall of the hopper, the at least one outlet port being in fluid communication with at least one applicator pump configured to apply suction to the hopper to pull fluidized powder coating material from the hopper.

12. The feed center of claim 1, wherein the hopper is releasably connected to the fluidizing pressure source.

* * * * *